(12) United States Patent
Blankenship et al.

(10) Patent No.: US 12,363,721 B2
(45) Date of Patent: Jul. 15, 2025

(54) BUNDLING FOR A CONFIGURED GRANT OR ASSIGNMENT IN A WIRELESS COMMUNICATION SYSTEM

(71) Applicant: Telefonaktiebolaget LM Ericsson (publ), Stockholm (SE)

(72) Inventors: Yufei Blankenship, Kildeer, IL (US); Bikramjit Singh, Kirkkonummi (FI); Majid Gerami, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 553 days.

(21) Appl. No.: 17/429,419

(22) PCT Filed: Feb. 14, 2020

(86) PCT No.: PCT/SE2020/050166
§ 371 (c)(1),
(2) Date: Aug. 9, 2021

(87) PCT Pub. No.: WO2020/167238
PCT Pub. Date: Aug. 20, 2020

(65) Prior Publication Data
US 2022/0132555 A1    Apr. 28, 2022

Related U.S. Application Data

(60) Provisional application No. 62/806,426, filed on Feb. 15, 2019.

(51) Int. Cl.
*H04W 72/23* (2023.01)
*H04L 1/08* (2006.01)
*H04L 1/1812* (2023.01)

(52) U.S. Cl.
CPC .............. *H04W 72/23* (2023.01); *H04L 1/08* (2013.01); *H04L 1/1812* (2013.01)

(58) Field of Classification Search
CPC ........ H04W 72/23; H04L 1/08; H04L 1/1812; H04L 1/1819; H04L 1/1887; H04L 1/189
See application file for complete search history.

(56) References Cited

U.S. PATENT DOCUMENTS

2014/0040694 A1    2/2014  Verma et al.
2016/0164643 A1*   6/2016  Loehr ..................... H04L 1/189
                                                       370/336
(Continued)

FOREIGN PATENT DOCUMENTS

EP        2836044 A1    2/2015

OTHER PUBLICATIONS

International Search Report and Written Opinion dated May 20, 2020 for International Application No. PCT/SE2020/050166 filed Feb. 14, 2020, consisting of 12-pages.
(Continued)

*Primary Examiner* — Chuong M Nguyen
(74) *Attorney, Agent, or Firm* — Weisberg I.P. Law, P.A.

(57) ABSTRACT

A wireless device is configured to receive control signaling from a radio network node. The control signaling configures an uplink grant or downlink assignment to periodically recur. The control signaling also configures a number of redundant transmissions of a transport block that are transmittable within a bundle of the configured uplink grant or downlink assignment, where the number is greater than or equal to one. The control signaling may also configure different sets of transmission occasions within which the number of redundant transmissions are transmittable during, or starting during, a period of the configured uplink grant or downlink assignment.

18 Claims, 21 Drawing Sheets

(56) References Cited

U.S. PATENT DOCUMENTS

| | | | |
|---|---|---|---|
| 2018/0124749 A1* | 5/2018 | Park | H04W 16/14 |
| 2018/0352547 A1 | 12/2018 | Tabet et al. | |
| 2019/0190644 A1* | 6/2019 | Ugurlu | H04L 27/2607 |
| 2019/0230689 A1* | 7/2019 | Cao | H04L 27/2602 |
| 2021/0282137 A1* | 9/2021 | Wang | H04W 72/23 |

OTHER PUBLICATIONS

3GPP TS 38.214 V15.2.0; 3rd Generation Partnership Project; Technical Specification Group Radio Access Network; NR; Physical layer procedures for data (Release 15), Jun. 2018, consisting of 94-pages.

ETSI TS 138 213 V15.3.0; 5G; NR; Physical layer procedures for control (3GPP TS 38.213 version 15.3.0 Release 15), Oct. 2018, consisting of 102-pages.

ETSI TS 138 331 V15.3.0; 5G; NR; Radio Resource Control (RRC); Protocol specification (3GPP TS 38.331 version 15.3.0 Release 15), Oct. 2018, consisting of 441-pages.

* cited by examiner

BUNDLING FOR A CONFIGURED GRANT OR ASSIGNMENT IN A WIRELESS COMMUNICATION SYSTEM

CROSS-REFERENCE TO RELATED APPLICATIONS

This application is a Submission Under 35 U.S.C. § 371 for U.S. National Stage Patent Application of International Application No.: PCT/SE2020/050166, filed Feb. 14, 2020 entitled "BUNDLING FOR A CONFIGURED GRANT OR ASSIGNMENT IN A WIRELESS COMMUNICATION SYSTEM," which claims priority to U.S. Provisional Application No. 62/806,426, filed Feb. 15, 2019, entitled "BUNDLING FOR A CONFIGURED GRANT OR ASSIGNMENT IN A WIRELESS COMMUNICATION SYSTEM," the entireties of both of which are incorporated herein by reference.

TECHNICAL FIELD

The present application relates generally to a wireless communication system, and relates more particularly to bundling for a configured grant or assignment in such a system.

BACKGROUND

Dynamic scheduling in a wireless communication network requires the network to signal a dynamic uplink grant or downlink assignment to a wireless device for each transmission occasion (also referred to as transmit time interval, TTI) in which the wireless device is to transmit or receive a transport block. This contributes meaningful signaling overhead, especially for service or traffic types that trigger recurring or periodic transport blocks (e.g., Voice-over-IP, VoIP). This signaling overhead may be reduced by (e.g., semi-statically) configuring an uplink grant or downlink assignment to periodically recur for a wireless device, without the wireless device having to receive any dynamic control signaling to accomplish that recurrence. In the context of downlink, this may be referred to as semi-persistent scheduling (SPS), as opposed to dynamic scheduling.

A configured uplink grant or downlink assignment may exploit so-called TTI bundling in order to also increase transmission/reception reliability and latency. In TTI bundling, multiple redundant versions of a transport block (e.g., in the form of hybrid automatic repeat-request, HARQ, retransmissions) are transmitted within a bundle of consecutive TTIs, without waiting for acknowledgement feedback from previous versions. Accordingly, in the context of a configured uplink grant or downlink assignment, multiple redundant versions of a transport block may be transmitted with each recurrence of the configured grant or assignment.

Some contexts however jeopardize the ability of a configured grant or assignment to realize the full reliability and latency improvements from TTI bundling. For at least for some types of traffic, for example, the times at which traffic arrives in the transmit buffer may fluctuate, so that sometimes traffic arrives only after the start of the configured grant or assignment's period. With at least some transmission occasions at the start of the period missed, fewer transmission occasions remain in the period, which in turn lowers the number of redundant versions of a transport block that can be transmitted in that period. Reducing the number of redundant versions transmitted threatens the reliability and latency with which the transport block can be transmitted.

SUMMARY

Some embodiments herein exploit multiple different sets of transmission occasions within which a number of redundant transmissions of a transport block can be transmitted within a bundle of a configured uplink grant or downlink assignment. In some embodiments, then, the different sets constitute different opportunities within the configured grant or assignment's period to transmit the same number of redundant transmissions, e.g., each set includes the same number of transmission occasions. In fact, in some embodiments, the different sets of transmission occasions start at different times within the configured grant or assignment's period. This way, the same number of redundant transmissions of a transport block can be transmitted no matter when during the period traffic arrives in the transmit buffer. This may in turn advantageously safeguard bundling's reliability and latency improvements against fluctuating traffic arrival times.

In some embodiments, a radio network node transmits control signaling that configures the different sets of transmission occasions. The control signaling may for instance indicate the offset in time between the sets of transmission occasions, indicate the number of the sets, or both. In other embodiments, the different sets of transmission occasions may be predefined. Or, one or more certain parameters may be predefined, where the sets are defined based on those one or more certain parameters. For example, in some embodiments, the offset in time between the sets is predefined, the number of the sets is predefined, or both.

More particularly, some embodiments herein include a method performed by a wireless device. The method includes receiving control signalling from a radio network node. The control signalling may configure an uplink grant or downlink assignment to periodically recur. The control signaling in some embodiments may alternatively or additionally configure a number of redundant transmissions of a transport block that are transmittable within a bundle of the configured uplink grant or downlink assignment, wherein the number is greater than or equal to one. The control signaling in one or more embodiments may alternatively or additionally configure different sets of transmission occasions within which the number of redundant transmissions are transmittable, e.g., during (or starting during) a period of the configured uplink grant or downlink assignment.

In some embodiments concerning a configured uplink grant, the method may also comprise selecting, from among the different sets of transmission occasions, a set of transmission occasions within which to transmit the number of redundant transmissions of the transport block. In other embodiments concerning a configured downlink assignment, the method may instead comprise attempting to detect the number of redundant transmissions of a transport block within each of one or more of the different sets of transmission occasions.

Regardless, in some embodiments, the method also comprises transmitting or receiving according to the configured uplink grant or downlink assignment as configured by the control signaling.

In some embodiments, the control signaling configures the different sets of transmission occasions by configuring an offset, wherein the control signaling includes an offset-step field that indicates the offset. The offset in some embodiments is an offset in time between the first transmission occasions of successively occurring ones of the different sets of transmission occasions. In other embodiments, the offset is an offset in time between a start of the period and the first transmission occasion of the first set of transmission occasions to start after the start of the period. Regardless, the method may further comprise determining, as a function of the period and the offset, a number of the different sets of transmission occasions.

In some embodiments, the control signaling configures the different sets of transmission occasions by configuring a number of the different sets of transmission occasions.

In some embodiments, the redundant transmissions of a transport block within a bundle are hybrid automatic repeat request, HARQ, retransmissions of the transport block, with each HARQ retransmission being transmitted without waiting for feedback from a previous transmission within the bundle. In some embodiments, the different HARQ retransmissions comprise respective redundancy versions of the transport block, wherein a first redundancy version in a redundancy version sequence for the transport block is transmittable in the first transmission occasion of each of the different sets of transmission occasions.

In some embodiments, the method further comprises transmitting or receiving according to the configured uplink grant or downlink assignment as configured by the control signaling.

In some embodiments, the configured uplink grant or downlink assignment is a configured uplink grant. In some embodiments, the control signaling comprises a ConfiguredGrantConfig information element of a Radio Resource Control, RRC, message.

In some embodiments, the method further comprises obtaining a transport block to transmit to the radio network node; and selecting, from among the different sets of transmission occasions, a set of transmission occasions within which to transmit the number of redundant transmissions of the transport block. This selecting may comprise selecting the next set of transmission occasions that occurs after the transport block is obtained or after the number of redundant transmissions of the transport block are obtained.

In some embodiments, the configured uplink grant or downlink assignment is a configured downlink assignment. In some embodiments, the control signaling comprises a SPS-Config information element of a Radio Resource Control, RRC, message.

In some embodiments, the configured uplink grant or downlink assignment is a configured downlink assignment. In one such embodiment, the method further comprises attempting to detect the number of redundant transmissions of a transport block within each of one or more of the different sets of transmission occasions.

Embodiments herein also include a corresponding method performed by a radio network node. The method includes transmitting control signalling to a wireless device. The control signalling may configure an uplink grant or downlink assignment to periodically recur. The control signaling in some embodiments may alternatively or additionally configure a number of redundant transmissions of a transport block that are transmittable within a bundle of the configured uplink grant or downlink assignment, wherein the number is greater than or equal to one. The control signaling in one or more embodiments may alternatively or additionally configure different sets of transmission occasions within which the number of redundant transmissions are transmittable, e.g., during (or starting during) a period of the configured uplink grant or downlink assignment.

In some embodiments concerning a configured downlink assignment, the method may also comprise selecting, from among the different sets of transmission occasions, a set of transmission occasions within which to transmit the number of redundant transmissions of the transport block. In other embodiments concerning a configured uplink grant, the method may instead comprise attempting to detect the number of redundant transmissions of a transport block within each of one or more of the different sets of transmission occasions.

Regardless, in some embodiments, the method also comprises transmitting or receiving according to the configured uplink grant or downlink assignment as configured by the control signaling.

In some embodiments, the control signaling configures the different sets of transmission occasions by configuring an offset, wherein the control signaling includes an offset-step field that indicates the offset. The offset may be either: an offset in time between the first transmission occasions of successively occurring ones of the different sets of transmission occasions; or an offset in time between a start of the period and the first transmission occasion of the first set of transmission occasions to start after the start of the period. In one such embodiment, the method further comprises determining, as a function of the period and the offset, a number of the different sets of transmission occasions.

In some embodiments, the control signaling configures the different sets of transmission occasions by configuring a number of the different sets of transmission occasions.

In some embodiments, the redundant transmissions of a transport block within a bundle are hybrid automatic repeat request, HARQ, retransmissions of the transport block, with each HARQ retransmission being transmitted without waiting for feedback from a previous transmission within the bundle. In one such embodiment, the different HARQ retransmissions comprise respective redundancy versions of the transport block. In some embodiments, a first redundancy version in a redundancy version sequence for the transport block is transmittable in the first transmission occasion of each of the different sets of transmission occasions.

In some embodiments, the method further comprises transmitting or receiving according to the configured uplink grant or downlink assignment as configured by the control signaling.

In some embodiments, the configured uplink grant or downlink assignment is a configured uplink grant. In some embodiments, the control signaling comprises a ConfiguredGrantConfig information element of a Radio Resource Control, RRC, message.

In some embodiments, the configured uplink grant or downlink assignment is a configured uplink grant. In one such embodiment, the method further comprises attempting to detect the number of redundant transmissions of a transport block within each of one or more of the different sets of transmission occasions.

In some embodiments, the configured uplink grant or downlink assignment is a configured downlink assignment. In one such embodiment, the control signaling comprises a SPS-Config information element of a Radio Resource Control, RRC, message.

In other embodiments, the configured uplink grant or downlink assignment is a configured downlink assignment. In one such embodiment, the method further comprises: obtaining a transport block to transmit to the wireless device; and selecting, from among the different sets of transmission occasions, a set of transmission occasions within which to transmit the number of redundant transmissions of the transport block. This selecting may comprise selecting the next set of transmission occasions that occurs after the transport block is obtained or after the number of redundant transmissions of the transport block are obtained.

Embodiments further include corresponding apparatus, computer programs, and carriers of those computer programs. For example, embodiments herein include a wireless device configured (e.g., via communication circuitry and processing circuitry) to receive control signaling from a radio network node. The control signaling may configure an uplink grant or downlink assignment to periodically recur. The control signaling may also configure a number of redundant transmissions of a transport block that are transmittable within a bundle of the configured uplink grant or downlink assignment, wherein the number is greater than or equal to one. The control signaling may further configure different sets of transmission occasions within which the number of redundant transmissions are transmittable during (or starting during) a period of the configured uplink grant or downlink assignment.

Embodiments herein moreover include a radio network node. The radio network node is configured (e.g., via communication circuitry and processing circuitry) to transmit control signaling to a wireless device. The control signaling may configure an uplink grant or downlink assignment to periodically recur. The control signaling may also configure a number of redundant transmissions of a transport block that are transmittable within a bundle of the configured uplink grant or downlink assignment, wherein the number is greater than or equal to one. The control signaling may further configure different sets of transmission occasions within which the number of redundant transmissions are transmittable during (or starting during) a period of the configured uplink grant or downlink assignment.

Other embodiments herein include a method performed by a wireless device. The method comprises receiving, from a radio network node, control signaling that configures an uplink grant or downlink assignment to periodically recur and configures a number of redundant transmissions of a transport block that are transmittable within a bundle of the configured uplink grant or downlink assignment, wherein the number is greater than or equal to one. The method further comprises determining different sets of transmission occasions within which the number of redundant transmissions are transmittable during (or starting during) a period of the configured uplink grant or downlink assignment. The method may also comprise transmitting or receiving one or more redundant transmissions of a transport block within one of the determined sets of transmission occasions.

In some embodiments, said determining is performed based on a predefined offset, wherein the predefined offset is an offset in time either: between the first transmission occasions of successively occurring ones of the different sets of transmission occasions; or between a start of the period and the first transmission occasion of the first set of transmission occasions to start after the start of the period.

In some embodiments, said determining comprises determining, as a function of the period and the predefined offset, a number of the different sets of transmission occasions.

In some embodiments, said determining is performed based on a predefined number of the different sets of transmission occasions, and wherein said determining comprising determining, as a function of the period and the number of the different sets of transmission occasions, an offset in time between the first transmission occasions of successively occurring ones of the different sets of transmission occasions.

In some embodiments, at least one of the sets of transmission occasions has a first transmission occasion that starts within the period and has a last transmission occasion that starts after an end of the period.

In some embodiments, the redundant transmissions of a transport block within a bundle are hybrid automatic repeat request, HARQ, retransmissions of the transport block, with each HARQ retransmission being transmitted without waiting for feedback from a previous transmission within the bundle. In one such embodiment, the different HARQ retransmissions comprise respective redundancy versions of the transport block. A first redundancy version in a redundancy version sequence for the transport block may be transmittable in the first transmission occasion of each of the different sets of transmission occasions.

In some embodiments, the configured uplink grant or downlink assignment is a configured uplink grant. In one such embodiment, the method further comprises: obtaining a transport block to transmit to the radio network node; and selecting, from among the different sets of transmission occasions, a set of transmission occasions within which to transmit the number of redundant transmissions of the transport block. In one embodiment, for example, said selecting comprises selecting the next set of transmission occasions that occurs after the transport block is obtained or after the number of redundant transmissions of the transport block are obtained.

In some embodiments, the configured uplink grant or downlink assignment is a configured downlink assignment. In one such embodiment, the method further comprises attempting to detect the number of redundant transmissions of a transport block within each of one or more of the different sets of transmission occasions.

Embodiments further include a method performed by a radio network node. The method comprises transmitting, to a wireless device, control signaling that configures an uplink grant or downlink assignment to periodically recur and configures a number of redundant transmissions of a transport block that are transmittable within a bundle of the configured uplink grant or downlink assignment, wherein the number is greater than or equal to one. The method also comprises determining different sets of transmission occasions within which the number of redundant transmissions are transmittable during (or starting during) a period of the configured uplink grant or downlink assignment. The method further comprises transmitting or receiving one or more redundant transmissions of a transport block within one of the determined sets of transmission occasions.

In some embodiments, said determining is performed based on a predefined offset, wherein the predefined offset is an offset in time either: between the first transmission occasions of successively occurring ones of the different sets of transmission occasions; or between a start of the period and the first transmission occasion of the first set of transmission occasions to start after the start of the period. In one such embodiment, said determining comprises determining, as a function of the period and the offset, a number of the different sets of transmission occasions.

In some embodiments, said determining is performed based on a predefined number of the different sets of transmission occasions, wherein said determining comprising determining, as a function of the period and the number of the different sets of transmission occasions, an offset in time between the first transmission occasions of successively occurring ones of the different sets of transmission occasions.

In some embodiments, at least one of the sets of transmission occasions has a first transmission occasion that starts within the period and has a last transmission occasion that starts after an end of the period.

In some embodiments, the redundant transmissions of a transport block within a bundle are hybrid automatic repeat request, HARQ, retransmissions of the transport block, with each HARQ retransmission being transmitted without waiting for feedback from a previous transmission within the bundle. In one such embodiment, the different HARQ retransmissions comprise respective redundancy versions of the transport block. In some embodiments, a first redundancy version in a redundancy version sequence for the transport block is transmittable in the first transmission occasion of each of the different sets of transmission occasions.

In some embodiments, the configured uplink grant or downlink assignment is a configured uplink grant. In one such embodiment, the method further comprises attempting to detect the number of redundant transmissions of a transport block within each of one or more of the different sets of transmission occasions.

In some embodiments, the configured uplink grant or downlink assignment is a configured downlink assignment. In one such embodiment, the method further comprises: obtaining a transport block to transmit to the wireless device; and selecting, from among the different sets of transmission occasions, a set of transmission occasions within which to transmit the number of redundant transmissions of the transport block. In some embodiments, said selecting comprises selecting the next set of transmission occasions that occurs after the transport block is obtained or after the number of redundant transmissions of the transport block are obtained.

Embodiments further include corresponding apparatus, computer programs, and carriers of those computer programs. For example, embodiments herein include a wireless device configured (e.g., via communication circuitry and processing circuitry) to receive, from a radio network node, control signaling that configures an uplink grant or downlink assignment to periodically recur and configures a number of redundant transmissions of a transport block that are transmittable within a bundle of the configured uplink grant or downlink assignment, wherein the number is greater than or equal to one. The wireless device is also configured to determine different sets of transmission occasions within which the number of redundant transmissions are transmittable during, or starting during, a period of the configured uplink grant or downlink assignment. The wireless device is further configured to transmit or receive one or more redundant transmissions of a transport block within one of the determined sets of transmission occasions.

Embodiments herein moreover include a radio network node. The radio network node is configured (e.g., via communication circuitry and processing circuitry) to transmit, to a wireless device, control signaling that configures an uplink grant or downlink assignment to periodically recur and configures a number of redundant transmissions of a transport block that are transmittable within a bundle of the configured uplink grant or downlink assignment, wherein the number is greater than or equal to one. The radio network node is further configured to determine different sets of transmission occasions within which the number of redundant transmissions are transmittable during, or starting during, a period of the configured uplink grant or downlink assignment. The radio network node is also configured to transmit or receive one or more redundant transmissions of a transport block within one of the determined sets of transmission occasions.

DETAILED DESCRIPTION

Figure 1:
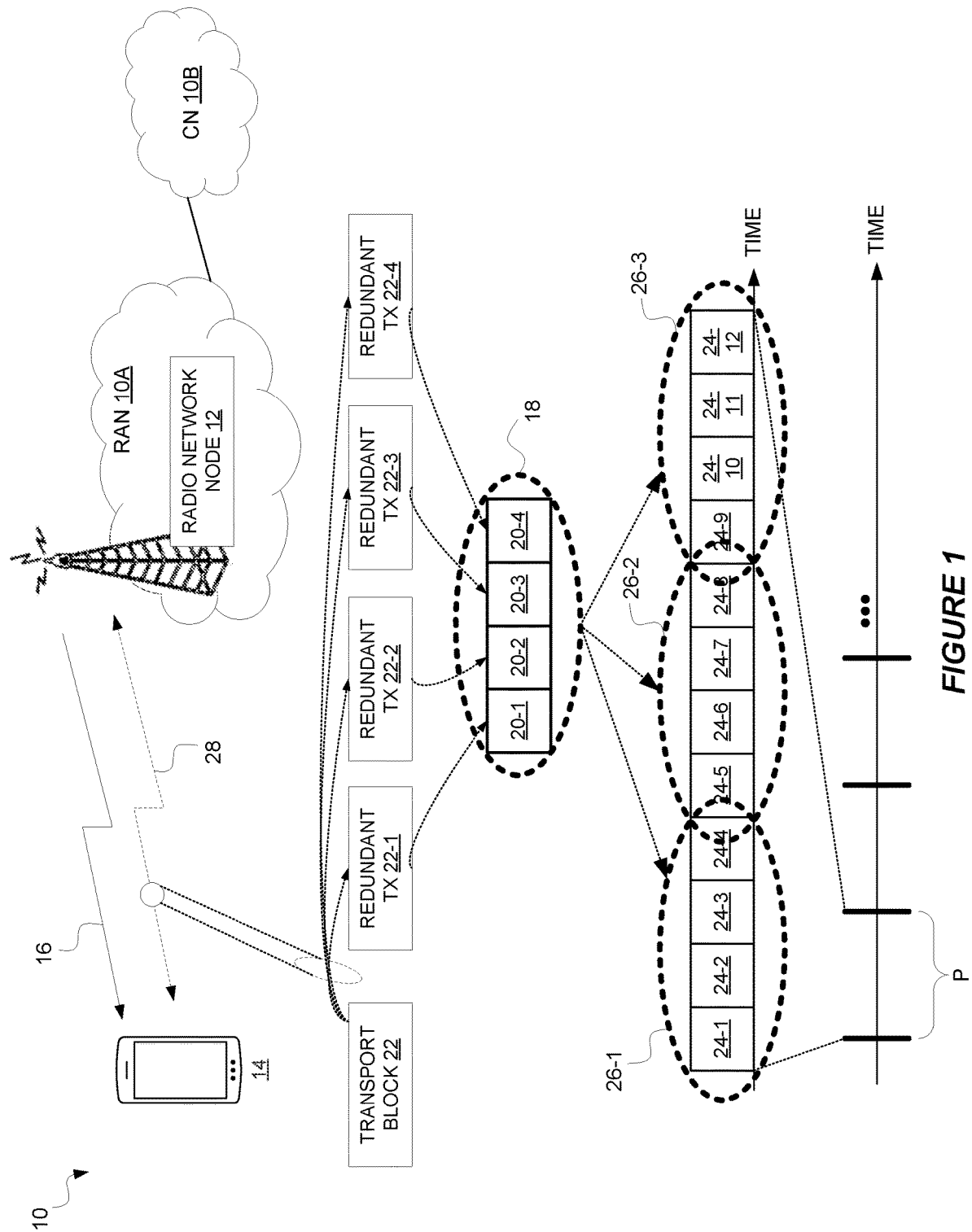
FIG. 1 is a block diagram of a wireless communication system according to some embodiments.

FIG. 1 shows a wireless communication system 10 (e.g., a New Radio, NR, system) according to some embodiments. The system 10 includes a radio access network (RAN) 10A and a core network (CN) 10B. The RAN 10A provides radio access to one or more wireless devices and provides a connection to the CN 10B. The CN 10B in turns connects to one or more external networks, such as the Internet.

More particularly in FIG. 1, a radio network node 12 (e.g., a base station) is configured to provide radio access to a wireless device 14. In this regard, the radio network node 12 according to some embodiments transmits control signaling 16 to the wireless device 14, e.g., via radio resource control (RRC) signalling. The wireless device 14 in turns receives this control signaling 16. The control signaling 16 may constitute one or more control messages, e.g., at the same protocol layer or across different protocol layers. Regardless, the control signaling 16 in some embodiments configures an uplink grant or downlink assignment for the wireless device 14 to periodically recur. As shown in FIG. 1, the control signaling 16 may for instance specify a periodicity or period P with which the uplink grant or downlink assignment is to recur.

In one sense, an uplink grant or downlink assignment may refer to a control message (e.g., a downlink control information, DCI, message) that grants or assigns a radio resource (e.g., a time-frequency resource) to the wireless device 14 for use in the uplink or downlink (e.g., on a Physical Uplink Shared Channel, PUSCH, for uplink or a Physical Downlink Shared Channel, PDSCH, for downlink). In another sense, an uplink grant or downlink assignment may refer to the actual radio resource that is granted or assigned to the wireless device 14. In either sense, though, the uplink grant or downlink assignment may be configured via the control signaling 16 to periodically recur. In some embodiments, for example, a medium access control (MAC) entity at the wireless device 14 shall consider that the configured uplink grant or downlink assignment periodically recurs.

In some embodiments, a bundle 18 of the configured uplink grant or downlink assignment includes a number K of (consecutive) transmission occasions 20-1, . . . 20-K (also referred to as transmit time intervals, TTIs), where K≥1. FIG. 1 shows an example where such a bundle 18 includes K=4 (consecutive) transmission occasions 20-1, 20-2, 20-3, and 20-4. This bundle 18 may be exploited for the transmission of a transport block 22, e.g., with improved reliability and latency.

More particularly in this regard, the same number K of redundant transmissions (TXs) 22-1, . . . 22-K of the transport block 22 may be generated or otherwise obtained for transmission in the uplink or downlink. The redundant transmissions may for instance comprise different Hybrid Automatic Repeat Request (HARQ) retransmissions or redundancy versions of the transport block 22. In this case, the different HARQ retransmissions or redundancy versions may be transmitted without waiting for HARQ feedback from a previous transmission. In any event, this number K of redundant transmissions 22-1, . . . 22-K may be transmitted within the bundle 18. For example, each of the redundant transmissions 22-1, . . . 22-K may be transmitted within a different respective transmission occasion 20-1, . . . 20-K included in the bundle 18. As shown, for instance, redundant TX 22-1 may be transmitted within transmission occasion 22-1, redundant TX 22-2 may be transmitted within transmission occasion 22-2, redundant TX 22-3 may be transmitted within transmission occasion 22-3, and redundant TX 22-4 may be transmitted within transmission occasion 22-4.

Regardless, the control signaling 16 in some embodiments may alternatively or additionally configure this number K of redundant transmissions 22-1, . . . 22-K that are transmittable within a bundle 18 of the configured uplink grant or downlink assignment. The control signaling 16 may for instance specify this number K using either a repK parameter (e.g., in a ConfiguredGrantConfig RRC IE for a configured uplink grant) or a pdsch-AggregationFactor parameter (e.g., for a configured downlink assignment).

Notably, according to some embodiments herein, the number K of redundant transmissions 22-1, . . . 22-K are transmittable in any one of multiple different sets of transmission occasions within the configured grant or assignment's period P. Each of the different sets may have the same number K of transmission occasions, such that each set equally supports the transmission of all K of the redundant transmissions 22-1 . . . 22-K. As shown in FIG. 1, for example, the 4 redundant transmissions 22-1, . . . 22-4 are transmittable in any one of multiple different sets 26-1, 26-2, and 26-3 of transmission occasions within the configured grant or assignment's period P, with each set 26-1, 26-2, and 26-3 having 4 transmission occasions. More particularly, set 26-1 includes transmission occasions 24-1 . . . 24-4, set 26-2 includes transmission occasions 24-5 . . . 24-8, and set 26-3 includes transmission occasions 24-9 . . . 24-12. In some sense, then, the transmissions occasions 20-1 . . . 20-4 within the bundle 18 of the configured grant or assignment may be either the transmission occasions 24-1 . . . 24-4 within set 26-1, the transmission occasions 24-5 . . . 24-8 within set 26-2, or the transmission occasions 24-9 . . . 24-12 within set 26-3. Or, in other words, the bundle 18 may be or correspond to set 26-1, set 26-2, or set 26-3.

The different sets herein may therefore generally constitute different opportunities within the configured grant or assignment's period P to transmit the same number K of redundant transmissions 22-1, . . . 22-K. In fact, as shown in FIG. 1, the different sets of transmission occasions may start at different times within the configured grant or assignment's period. That is, the different sets of transmission occasions may be offset in time relative to one another within the period P. This way, the same number K of redundant transmissions 22-1, . . . 22-K of the transport block 22 can be transmitted no matter when during the period P the transport block 22 arrives in the transmit buffer. For example, if the transport block 22 arrives before the start of the period P, the redundant transmissions 22-1 . . . 22-4 may be transmitted within the set 26-1 of transmission occasions 24-1 . . . 24-4. But if the transport block 22 arrives after the start of the period P but before transmission occasions 24-5, the redundant transmissions 22-1 . . . 22-4 may be transmitted within the set 26-2 of transmission occasions 24-5 . . . 24-8. And if the transport block 22 arrives after the start of transmission occasion 24-5 but before the end of transmission occasion 24-8, the redundant transmissions 22-1 . . . 22-4 may be transmitted within the set 26-3 of transmission occasions 24-9 . . . 24-12. As this example demonstrates, then, some embodiments may advantageously safeguard bundling's reliability and latency improvements against fluctuating transport block arrival times.

Indeed, the transmitting node (i.e., the wireless device 14 for a configured uplink grant or the radio network node 12 for a configured downlink assignment) may select, from among the different sets 26-1, 26-2, and 26-3 of transmission occasions, a set of transmission occasions within which to transmit the number K of redundant transmissions 22-1, . . . 22-K of the transport block 22. For example, the transmitting node may select the next set of transmission occasions that occurs after the transport block 22 is obtained or after the number K of redundant transmissions of the transport block 22 are obtained. The transmitting node may then transmit the redundant transmissions within the selected set as transmission 28.

Correspondingly, the receiving node (i.e., the wireless device 14 for a configured downlink assignment or the radio network node 12 for a configured uplink grant) may attempt to detect the number K of redundant transmissions 22-1 . . . 22-K of the transport block 22 within each of one or more of the different sets of transmission occasions. The receiving node may for instance perform blind detection or decoding.

Figure 8:
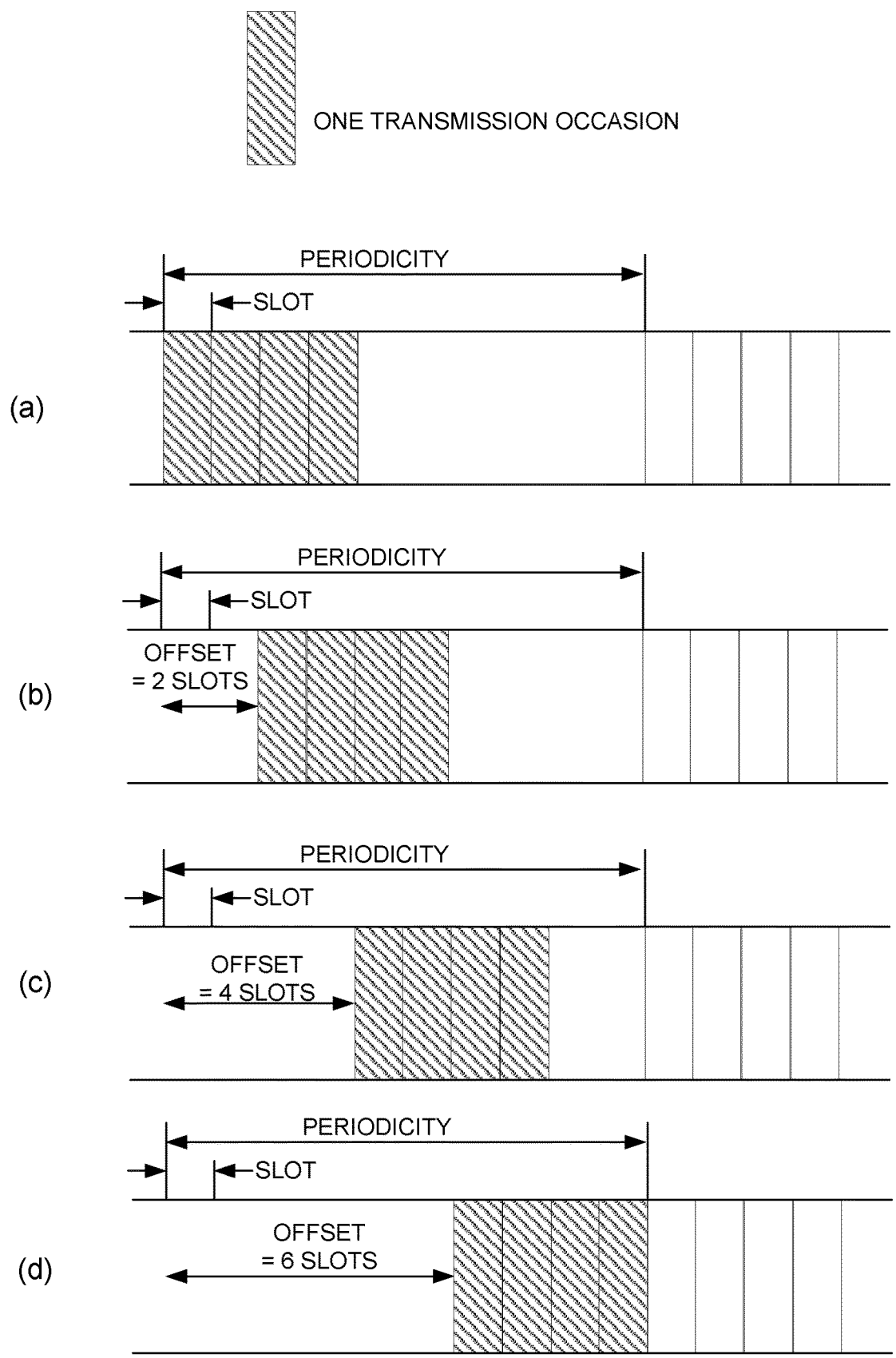
FIGS. 8a-d are block diagrams of different possible transmissions according to an uplink configured grant with repetitions and starting occasion offset, according to some embodiments.
Figure 10:
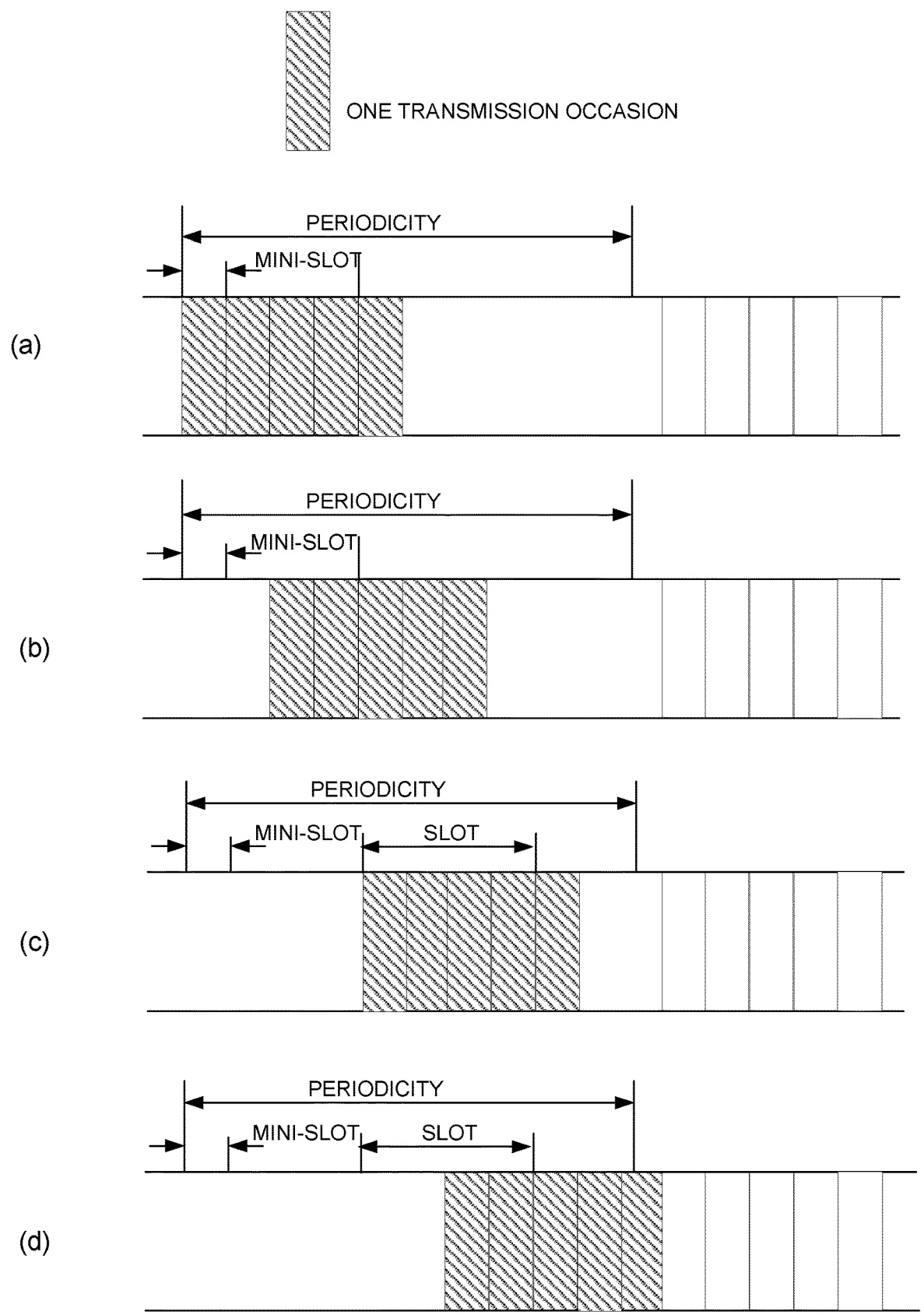
FIGS. 10a-d are block diagrams of different possible transmissions according to an uplink configured grant with repetitions and starting occasion offset, where the uplink configured grant with repetition is configured with a mini-slot duration, according to some embodiments.

Note that FIG. 1 showed the different sets of transmission occasions as non-overlapping for ease of illustration. In other embodiments, though, the different sets of transmission occasions may partially overlap, e.g., so that one or more (but not all) transmission occasions are common to two or more sets. FIGS. 8 and 10 show examples of these latter embodiments.

Note further that FIG. 1 showed the different sets of transmission occasions as each being completely contained within the period P. In some embodiments, though, at least one of the sets of transmission occasions (e.g., the last one in time) has a first transmission occasion that starts within the period P and has a last transmission occasion that starts after an end of the period P. In this case, then, at least one of the sets may cross a period boundary.

Note also that the transmission occasions may be specified in any units in the time domain, e.g., a time slot, a mini-slot, or the like. FIG. 8 shows one example in terms of slots and FIG. 10 shows one example in terms of mini-slots.

In some embodiments, the control signaling 16 configures the different sets of transmission occasions. The control signaling 16 may for instance indicate an offset in time between the sets of transmission occasions. The control signaling 16 may for instance configure an offset in time between the first transmission occasions of successively occurring ones of the different sets of transmission occasions. Alternatively or additionally, the control signaling 16 may configure an offset in time between a start of the period P and the first transmission occasion of the first set of transmission occasions to start after the start of the period P. In this case, the remaining set(s) of transmission occasions may be determinable from the control signaling 16. Embodiments below exemplify the control signaling 16 in such cases as including an offset, step size, or offset-step parameter that indicates such an offset or step size.

Alternatively or additionally, the control signaling 16 may indicate the number of the sets.

Alternatively or additionally, the offset may be calculated or otherwise determined from the number of sets, or vice versa. See, e.g., equations (1) and (2).

In other embodiments, the different sets of transmission occasions, or one or more certain parameters based on which the sets are defined, may be predefined. For example, in some embodiments, the offset in time between the sets is predefined, the number of the sets is predefined, or both.

Figure 2A:
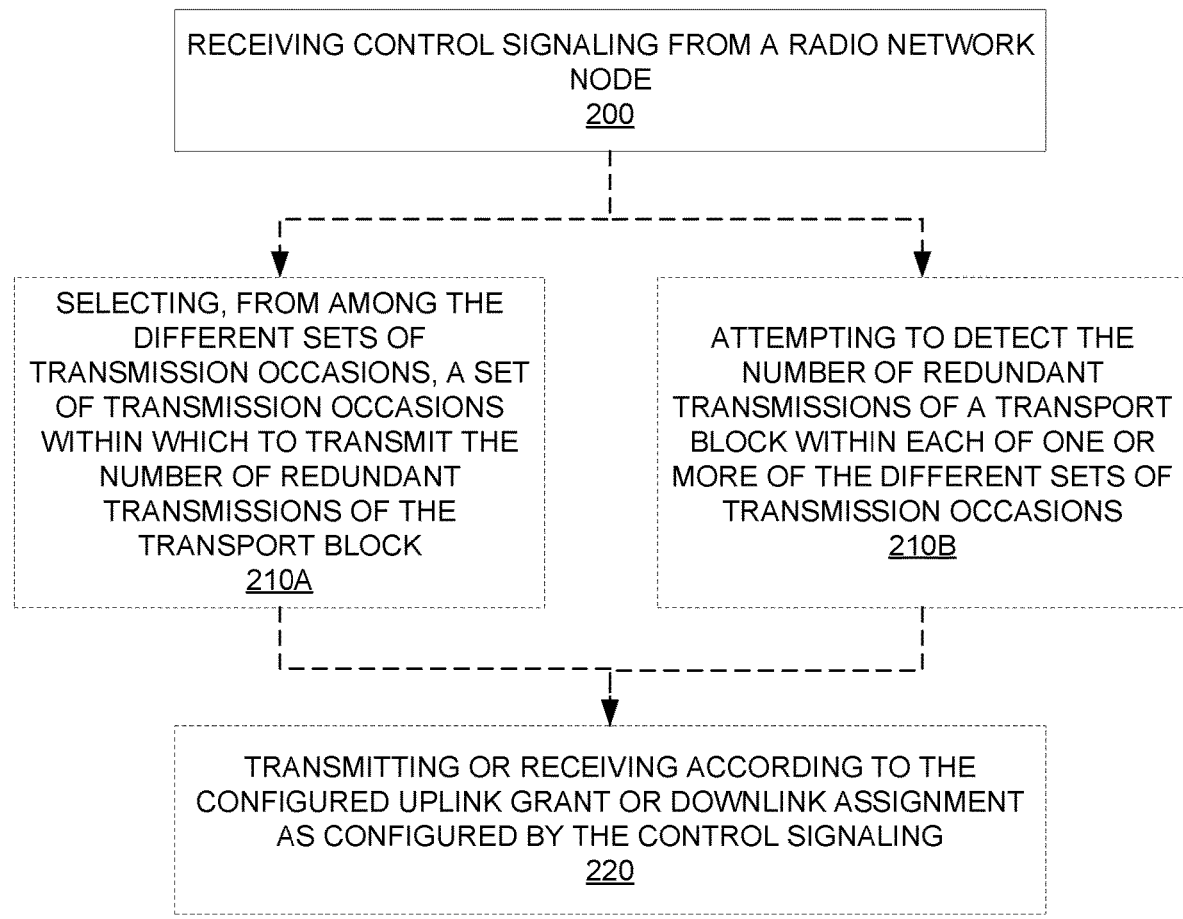
FIG. 2A is a logic flow diagram of a method performed by a wireless device according to some embodiments.

In view of the above modifications and variations, FIG. 2A depicts a method performed by a wireless device 14 in accordance with particular embodiments. The method includes receiving control signalling 16 from a radio network node 12 (Block 200). The control signalling 16 may configure an uplink grant or downlink assignment to periodically recur. The control signaling 16 in some embodiments may alternatively or additionally configure a number K of redundant transmissions 22-1, . . . 22-K of a transport block 22 that are transmittable within a bundle 18 of the configured uplink grant or downlink assignment. This number K may be greater than or equal to one. The control signaling 16 in one or more embodiments may alternatively or additionally configure different sets of transmission occasions within which the number K of redundant transmissions 22-1, . . . 22-K are transmittable, e.g., during (or starting during) a period P of the configured uplink grant or downlink assignment.

In some embodiments concerning a configured uplink grant, the method may also comprise selecting, from among the different sets of transmission occasions, a set of transmission occasions within which to transmit the number of redundant transmissions 22-1, . . . 22-K of the transport block 22 (Block 210A). In other embodiments concerning a configured downlink assignment, the method may instead comprise attempting to detect the number of redundant transmissions 22-1, . . . 22-K of a transport block 22 within each of one or more of the different sets of transmission occasions (Block 210B).

Regardless, in some embodiments, the method also comprises transmitting or receiving according to the configured uplink grant or downlink assignment as configured by the control signaling 16 (Block 220).

Figure 2B:
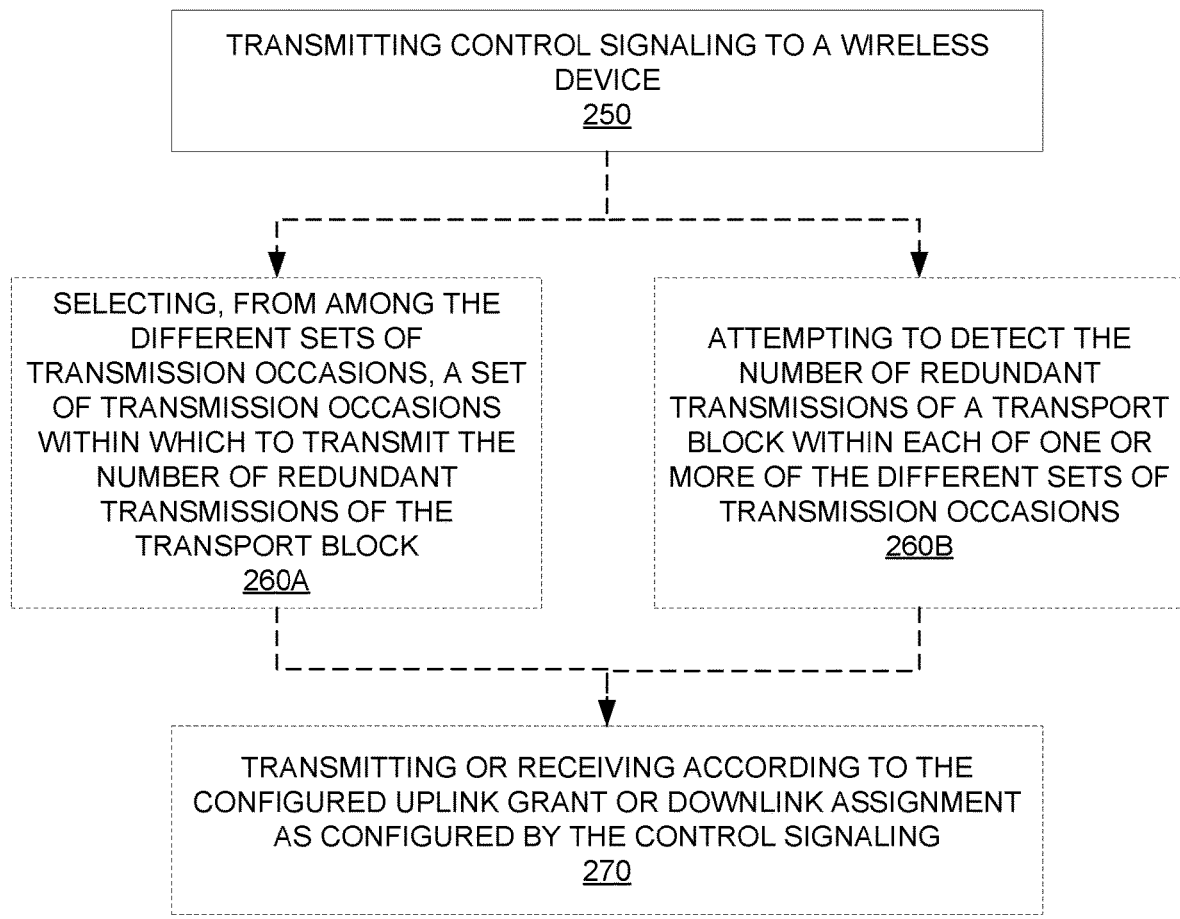
FIG. 2B is a logic flow diagram of a method performed by a radio network node according to some embodiments.

FIG. 2B depicts a corresponding method performed by a radio network node 12 in accordance with other particular embodiments. The method includes transmitting control signalling 16 to a wireless device 14 (Block 250). The control signalling 16 may configure an uplink grant or downlink assignment to periodically recur. The control signaling 16 in some embodiments may alternatively or additionally configure a number K of redundant transmissions 22-1, . . . 22-K of a transport block that are transmittable within a bundle 18 of the configured uplink grant or downlink assignment. This number K may be greater than or equal to one. The control signaling 16 in one or more embodiments may alternatively or additionally configure different sets of transmission occasions within which the number K of redundant transmissions 22-1, . . . 22-K are transmittable, e.g., during (or starting during) a period P of the configured uplink grant or downlink assignment.

In some embodiments concerning a configured downlink assignment, the method may also comprise selecting, from among the different sets of transmission occasions, a set of transmission occasions within which to transmit the number K of redundant transmissions 22-1, . . . 22-K of the transport block (Block 260A). In other embodiments concerning a configured uplink grant, the method may instead comprise attempting to detect the number K of redundant transmissions 22-1, . . . 22-K of a transport block 18 within each of one or more of the different sets of transmission occasions (Block 260B).

Regardless, in some embodiments, the method also comprises transmitting or receiving according to the configured uplink grant or downlink assignment as configured by the control signaling 16 (Block 270).

Figure 3A:
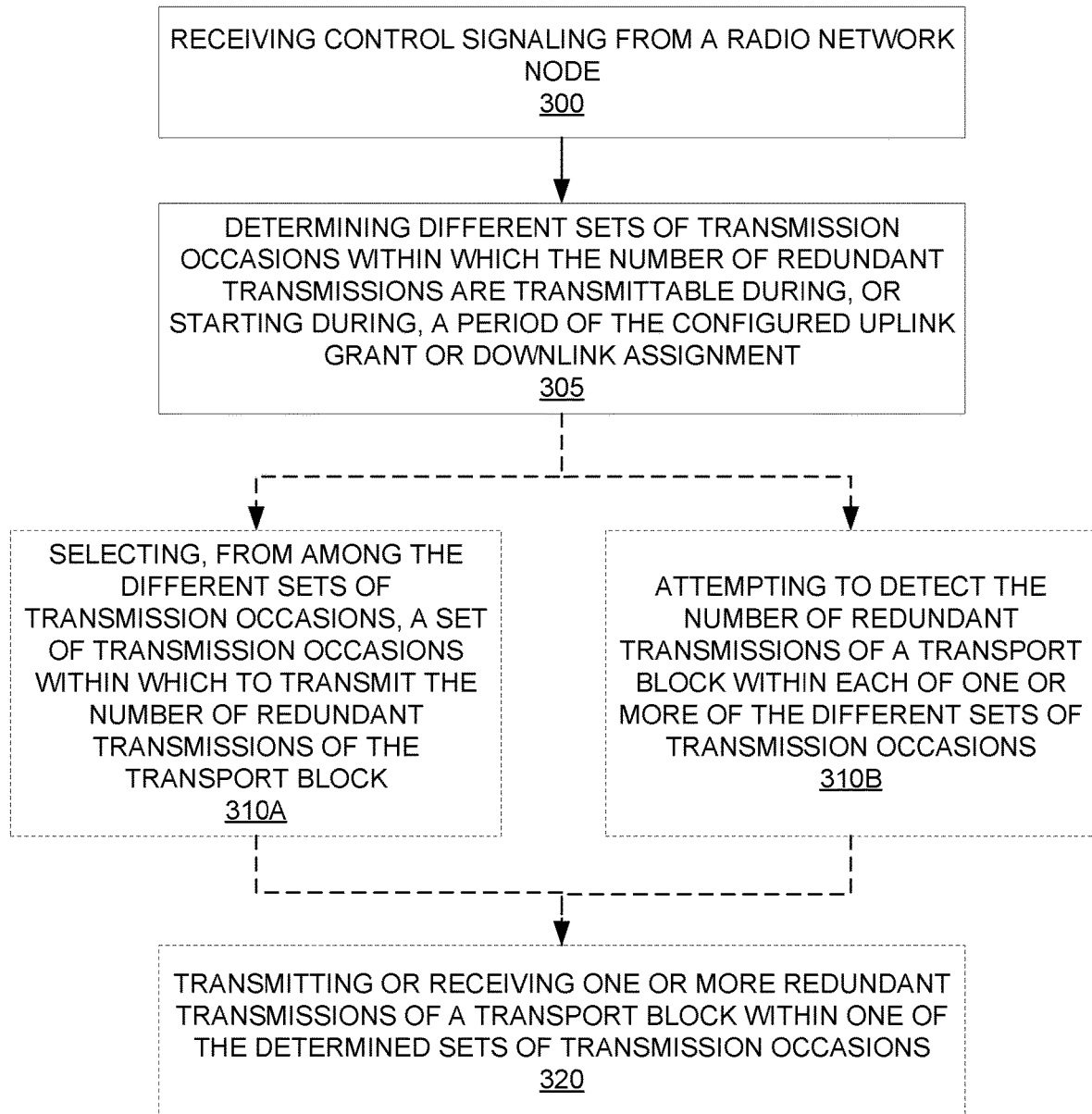
FIG. 3A is a logic flow diagram of a method performed by a wireless device according to other embodiments.

FIG. 3A depicts a method performed by a wireless device 14 in accordance with particular embodiments. The method includes receiving control signalling 16 from a radio network node 12 (Block 300). The control signalling 16 may configure an uplink grant or downlink assignment to periodically recur. The control signaling 16 in some embodiments may alternatively or additionally configure a number of redundant transmissions 22-1, . . . 22-K of a transport block that are transmittable within a bundle of the configured uplink grant or downlink assignment. This number may be greater than or equal to one.

The method in some embodiments alternatively or additionally includes determining different sets of transmission occasions within which the number of redundant transmissions 22-1, . . . 22-K are transmittable during, or starting during, a period of the configured uplink grant or downlink assignment (Block 305). This determination may for instance be performed based on one or more predefined parameters, such as a predefined offset in time between the first transmission occasions of successively occurring ones of the different sets of transmission occasions and/or a predefined number of the different sets of transmission occasions.

In some embodiments concerning a configured uplink grant, the method may also comprise selecting, from among the different sets of transmission occasions, a set of transmission occasions within which to transmit the number of redundant transmissions 22-1, . . . 22-K of the transport block (Block 310A). In other embodiments concerning a configured downlink assignment, the method may instead comprise attempting to detect the number of redundant transmissions 22-1, . . . 22-K of a transport block within each of one or more of the different sets of transmission occasions (Block 310B).

Regardless, in some embodiments, the method also comprises transmitting or receiving one or more redundant transmissions 22-1, . . . 22-K of a transport block within one of the determined sets of transmission occasions (Block 320).

Figure 3B:
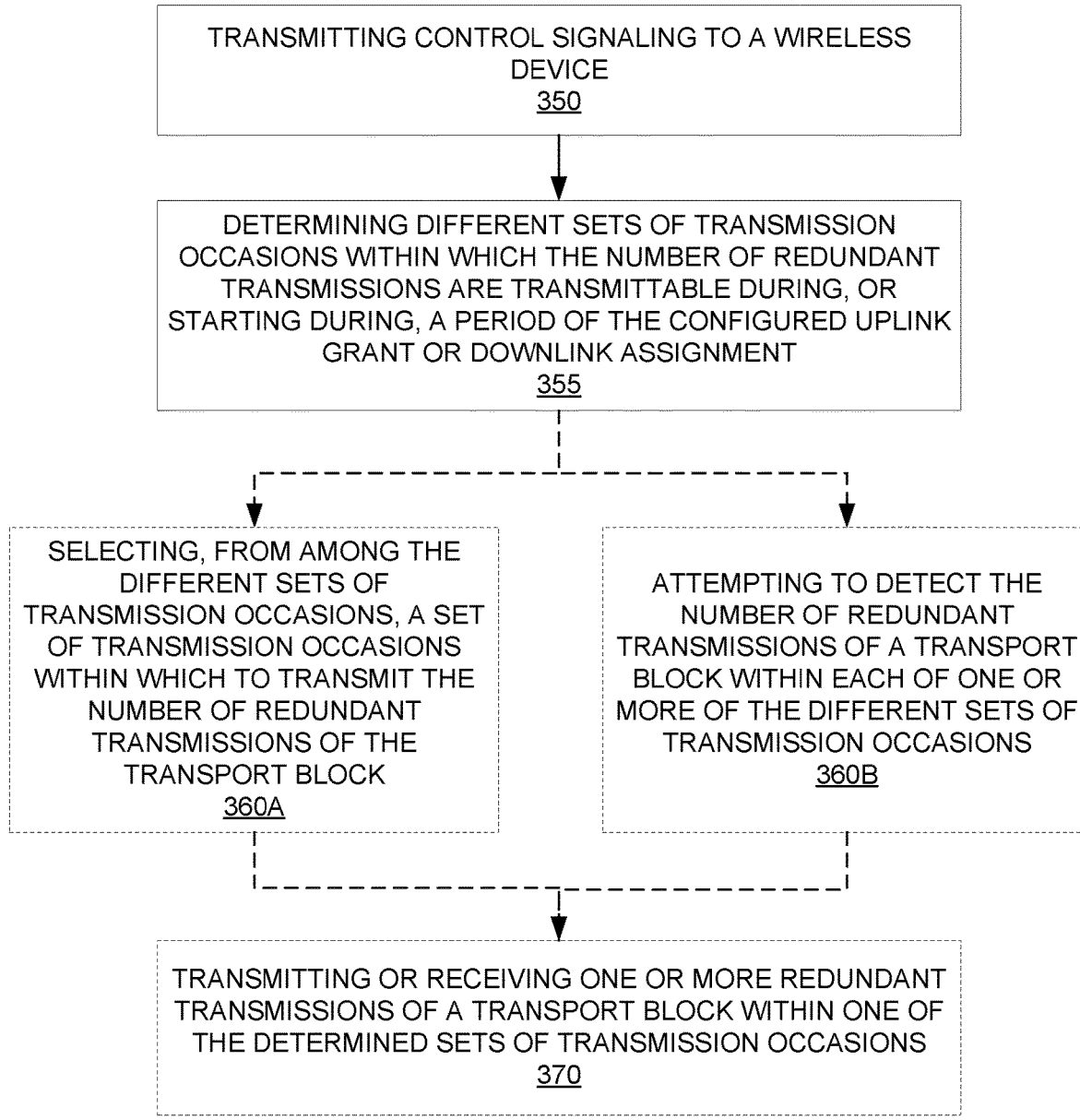
FIG. 3B is a logic flow diagram of a method performed by a radio network node according to other embodiments.

FIG. 3B depicts a corresponding method performed by a radio network node 12 in accordance with other particular embodiments. The method includes transmitting control signalling 16 to a wireless device 14 (Block 350). The control signalling 16 may configure an uplink grant or downlink assignment to periodically recur. The control signaling 16 in some embodiments may alternatively or additionally configure a number of redundant transmissions 22-1, . . . 22-K of a transport block that are transmittable within a bundle of the configured uplink grant or downlink assignment.

The method in some embodiments alternatively or additionally includes determining different sets of transmission occasions within which the number of redundant transmissions 22-1, . . . 22-K are transmittable during, or starting during, a period of the configured uplink grant or downlink assignment (Block 355). This determination may for instance be performed based on one or more predefined parameters, such as a predefined offset in time between the first transmission occasions of successively occurring ones of the different sets of transmission occasions and/or a predefined number of the different sets of transmission occasions.

In some embodiments concerning a configured downlink assignment, the method may also comprise selecting, from among the different sets of transmission occasions, a set of transmission occasions within which to transmit the number of redundant transmissions 22-1, . . . 22-K of the transport block (Block 360A). In other embodiments concerning a configured uplink grant, the method may instead comprise attempting to detect the number of redundant transmissions 22-1, . . . 22-K of a transport block within each of one or more of the different sets of transmission occasions (Block 360B).

Regardless, in some embodiments, the method also comprises transmitting or receiving one or more redundant transmissions 22-1, . . . 22-K of a transport block within one of the determined sets of transmission occasions (Block 370).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
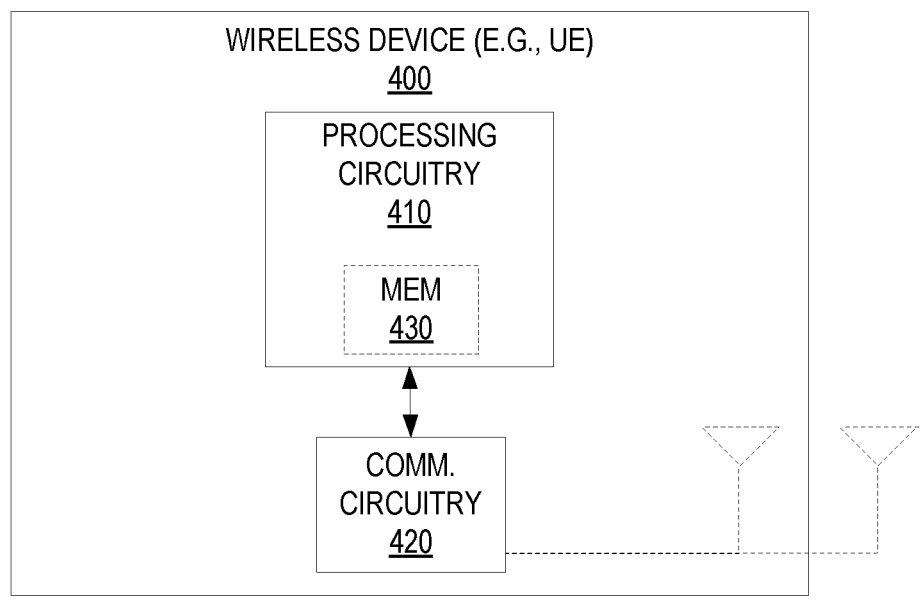
FIG. 4 is a block diagram of a wireless device according to some embodiments.

FIG. 4 for example illustrates a wireless device 400 (e.g., wireless device 14) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, e.g., in FIG. 2A and/or 3A, such as by executing instructions stored in memory 430. The processing circuitry 410 in this regard may implement certain functional means, units, or modules.

Figure 5:
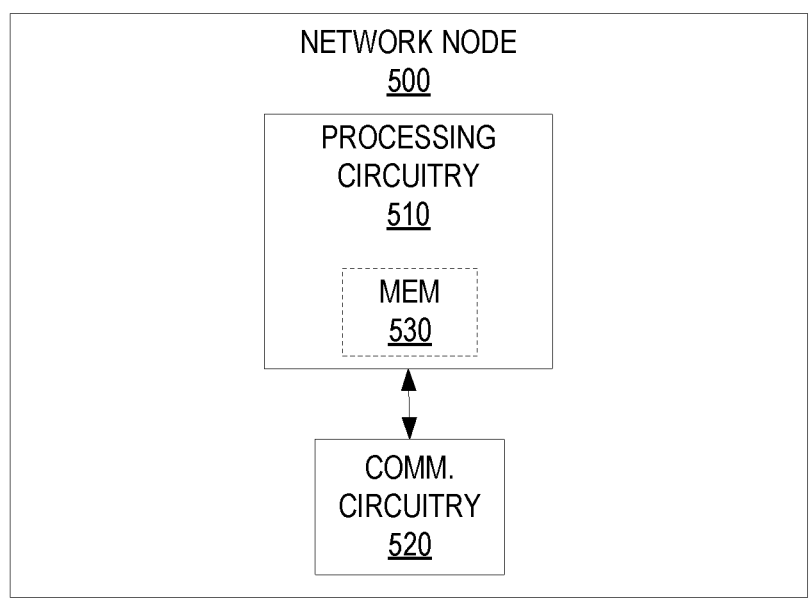
FIG. 5 is a block diagram of a radio network node according to some embodiments.

FIG. 5 illustrates a network node 500 (e.g., radio network node 12) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 2B and/or FIG. 3B, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

New Radio (NR) supports two types of transmissions, Type A and Type B. Type A transmissions are slot-based, where a slot is defined as 14 Orthogonal Frequency Division Multiplexing (OFDM) symbols, while Type B is non-slot-based. The purpose with Type B enables making short transmissions that can start and end more flexibly in time than Type A. Mini-slot transmissions can be dynamically scheduled and in rel-15 they: (1) can be of length 7, 4, or 2 symbols in the downlink (DL); (2) can be of any length between 1 and 14 symbols in UL; and (3) can start and end within in any symbol within a slot. Type B transmissions are therefore important for URLLC (Ultra-Reliable Low-Latency Communication) since it reduces latency; the transmissions can be scheduled and start sooner than for slot-based transmissions where scheduling and transmissions need to wait until the next slot.

NR supports two types of configured grants (CG), Type 1 and Type 2. For Type 1, the user equipment (UE) is radio resource control (RRC) configured with a grant that indicate all needed transmission parameters, while for Type 2 the configured grant is partly RRC configured and partly Layer 1 (L1) signaled (downlink control information, DCI, signaling). For Type 2 configured grant, the resource allocation follows an UL grant received on the DCI and the resource then recurs periodically whose period is configured by RRC. The UL grant has the time-domain resource assignment field that provides a row index of a higher-layer configured table pusch-symbolAllocation, where the indexed row defines the slot offset K2, the start and length indicator SLIV, and the Physical Uplink Shared Channel (PUSCH) mapping type to be applied in the PUSCH transmission. The UE transmits a MAC-CE (Medium Access Control-Control Element) confirm message when the configured grant is activated or deactivated.

The RRC ConfiguredGrantConfig information element is defined in 3GPP Technical Specification (TS) 38.331, as shown below according to 38.331 V15.3.0.

ConfiguredGrantConfig Information Element

```
-- ASN1START
-- TAG-CONFIGUREDGRANTCONFIG-START
ConfiguredGrantConfig ::= SEQUENCE {
    frequencyHopping            ENUMERATED {intraSlot, interSlot}
                                    OPTIONAL, -- Need S,
    cg-DMRS-Configuration       DMRS-UplinkConfig,
    mcs-Table                   ENUMERATED {qam256, qam64LowSE}
                                    OPTIONAL, -- Need S
    mcs-TableTransformPrecoder  ENUMERATED {qam256, qam64LowSE}
                                    OPTIONAL, -- Need S
    uci-OnPUSCH                 SetupRelease { CG-UCI-OnPUSCH }
                                    OPTIONAL, -- Need M
    resourceAllocation          ENUMERATED { resourceAllocationType0,
                                    resourceAllocationType1, dynamicSwitch },
    rbg-Size                    ENUMERATED {config2}   OPTIONAL, -- Need S
    powerControlLoopToUse       ENUMERATED {n0, n1},
    p0-PUSCH-Alpha              P0-PUSCH-AlphaSetId,
    transformPrecoder           ENUMERATED {enabled, disabled}
                                    OPTIONAL, -- Need S
    nrofHARQ-Processes          INTEGER(1..16),
    repK                        ENUMERATED {n1, n2, n4, n8},
    repK-RV                     ENUMERATED {s1-0231, s2-0303, s3-0000}
                                    OPTIONAL, -- Need R
    periodicity                 ENUMERATED {
                                    sym2, sym7, sym1x14, sym2x14, sym4x14,
                                    sym5x14, sym8x14, sym10x14, sym16x14,
                                    sym20x14, sym32x14, sym40x14, sym64x14,
                                    sym80x14, sym128x14, sym160x14,
                                    sym256x14, sym320x14, sym512x14,
                                    sym640x14, sym1024x14, sym1280x14,
                                    sym2560x14, sym5120x14, sym6, sym1x12,
                                    sym2x12, sym4x12, sym5x12, sym8x12,
                                    sym10x12, sym16x12, sym20x12, sym32x12,
                                    sym40x12, sym64x12, sym80x12, sym128x12,
                                    sym160x12, sym256x12, sym320x12,
                                    sym512x12, sym640x12, sym1280x12,
                                    sym2560x12
                                },
    configuredGrantTimer        INTEGER (1..64)   OPTIONAL, -- Need R
    rrc-ConfiguredUplinkGrant   SEQUENCE {
        timeDomainOffset            INTEGER (0..5119),
        timeDomainAllocation        INTEGER (0..15),
        frequencyDomainAllocation   BIT STRING (SIZE(18)),
        antennaPort                 INTEGER (0..31),
        dmrs-SeqInitialization      INTEGER (0..1) OPTIONAL, -- Need R
        precodingAndNumberOfLayers  INTEGER (0..63),
```

```
    srs-ResourceIndicator              INTEGER (0..15) OPTIONAL,   -- Need R
    mcsAndTBS                          INTEGER (0..31),
    frequencyHoppingOffset   INTEGER (1..maxNrofPhysicalResourceBlocks-1)
                                       OPTIONAL,   -- Need R
    pathlossReferenceIndex   INTEGER (0..maxNrofPUSCH-
                                             PathlossReferenceRSs-1),
    ...
} OPTIONAL,   -- Need R
    ...
}
CG-UCI-OnPUSCH ::= CHOICE {
    dynamic                  SEQUENCE (SIZE (1..4)) OF BetaOffsets,
    semiStatic               BetaOffsets
}
```

In 3GPP 38.214 V. 15.2.0 Section 6.12.3.1, it is stated that:

"For both Type 1 and Type 2 PUSCH transmissions with a configured grant, when the UE is configured with repK>1, the UE shall repeat the transport block (TB) across the repK consecutive slots applying the same symbol allocation in each slot. If the UE procedure for determining slot configuration, as defined in subclause 11.1 of [6, TS 38.213], determines symbols of a slot allocated for PUSCH as downlink symbols, the transmission on that slot is omitted for multi-slot PUSCH transmission."

Figure 6:
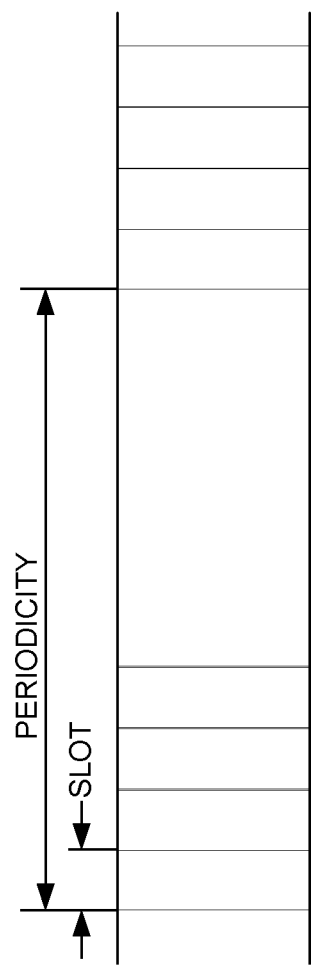
FIG. 6 is a block diagram of a uplink configured grant with repetition.
Figure 7:
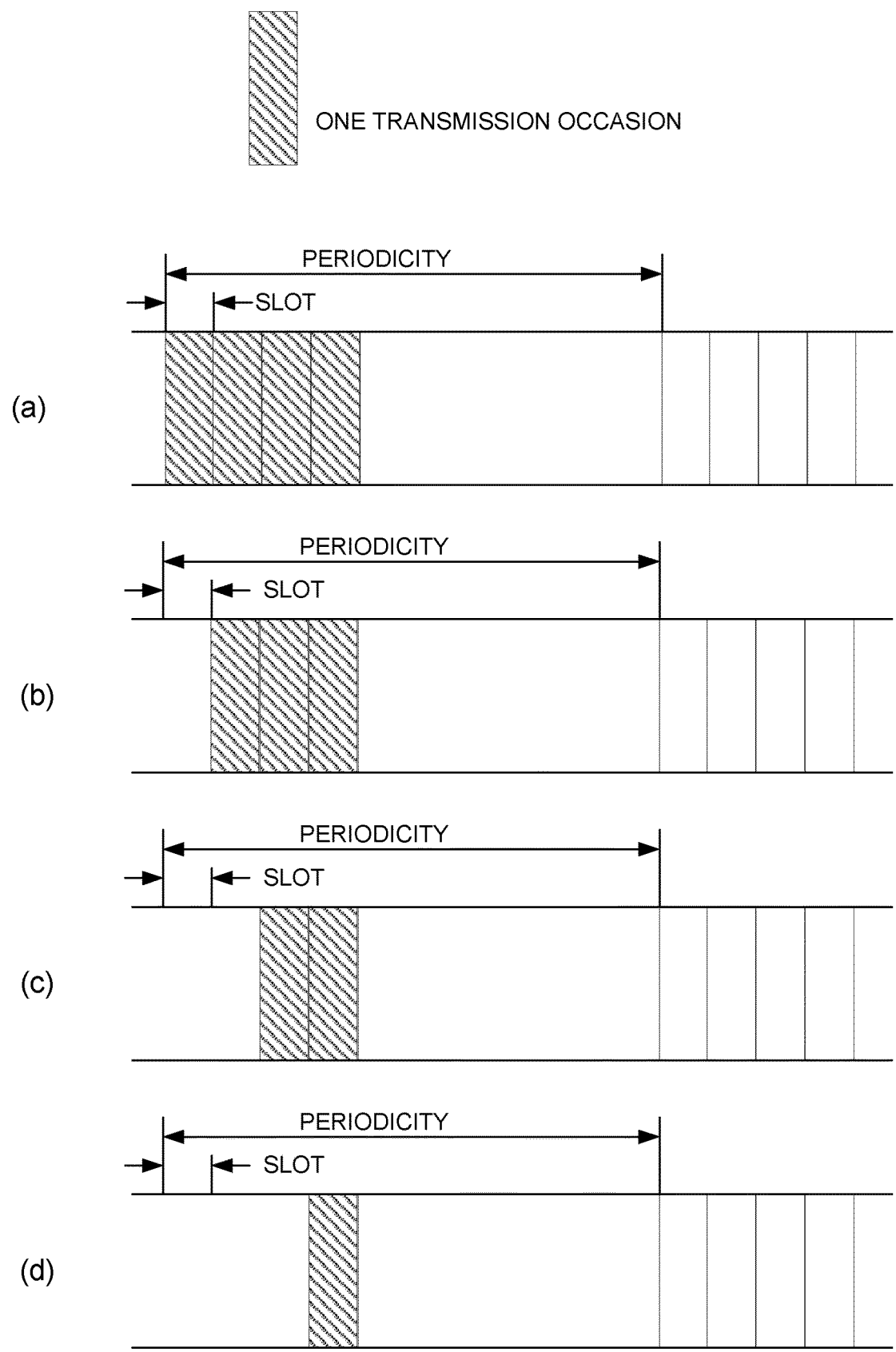
FIGS. 7a-d are block diagrams of different possible transport block transmissions starting at different slots, depending on when data arrives.

An example of a Rel-15 UL configured grant with repetition is illustrated in FIG. 6, with periodicity=10 slots and repK=4. Here, 4 slots in a period are referred to as 4 transmission occasions (TOs) for the K=4 repetitions. In the rest of the period (slots not shown), TOs are not available. In Rel-15 UL configured grant with repetition, a transmission set of a Transport Block (TB) (including repK repetitions of the TB) can start in any of repK consecutive slots j, j=0, 1, . . . , repK-1, when RV sequence {0,0,0,0} is used. In Rel-15, the transmission set of a TB has to end at the repK slot, as measured from the start of a period, causing the duration of transmission sets starting at the j-th slot to be shortened by (repK-j) slots, when j>1. This is illustrated in FIG. 7, with periodicity=10 slots and repK=4. In FIGS. 7(a)-(d), the 4 possible TB transmissions within the set start with the $0^{th}$, $1^{st}$, $2^{nd}$, $3^{rd}$ slot, respectively, when redundancy version (RV) sequence of {0,0,0,0} is configured. This may be for instance because the data arrives at different times, causing the number of repetitions to be less than the 4 TOs available. For example, in FIG. 7(a), the data may arrive prior to the first TO, so 4 repetitions may be transmitted within 4 respective TOs available. But, in FIG. 7(d), the data may arrive only after the start of the $3^{rd}$ TO, just prior to the start of the $4^{th}$ TO, meaning that only 1 repetition may be transmitted within the last ($4^{th}$) available TO. When other RV sequences are configured, the transmission set can at any transmission occasion that uses RV=0.

There currently exist certain challenge(s). In Rel-15 UL configured grant, when a UE is configured with TB repetition with parameter repK>1, the UE shall repeat the TB across repK consecutive slots over fixed transmission occasions (TOs). In case of fluctuating traffic, a UE can miss some or all TOs within a period, as shown above with respect to FIG. 7. This may force the UE to settle with partial repetitions or look for TOs in the next period, and this can undermine reliability.

Certain aspects of the present disclosure and their embodiments may provide solutions to these or other challenges. Some embodiments introduce a new parameter called repetition offset (also referred to as offset step, or simply offset) for K (='repK') repetitions in UL Configured Grant (CG). The parameter repetitions offset defines the time gap between the period boundary and the possible first repetition of a transport block. The rest of the K-1 consecutive repetitions follows the first repetition.

Similarly, the offset can be introduced for DL PDSCH repetitions.

Certain embodiments may provide one or more of the following technical advantage(s). The offset advantageously allows all repetitions of a transport block to be transmitted, even in the face of fluctuating traffic, e.g., unlike in FIG. 7.

UL Configured Grant PUSCH Repetition with Time Offset in Starting Occasion

In this embodiment, an offset is applied to the starting transmission occasion for a given period of an UL configured grant. The transmission of a TB may extend beyond the repK slot as measured from the start of a period. This may mean that there are multiple possible starting points for transmitting a TB (on the PUSCH); that is, multiple possible transmission sets of a TB, with the transmission sets having different possible starting points. The possible PUSCH starting points of respective transmission sets are: $j \times \Delta$ (slot), $j=0$, 1, . . . , $j_{max}$. Parameter $\Delta$ is the step size of starting point offset. Each possible transmission set has the duration of repK slots. The transmission set offset has the benefit of reducing alignment delay for the uplink data transmitted by the UE.

For the gNB, blind detection of PUSCH has to be performed since there are multiple starting points of transmission sets. In some embodiments, the gNB performs detection of PUSCH with each possible starting points $j \times \Delta$ (slot), one by one, sequentially, starting with $j=0$. If the detection is successful at starting point $j \times \Delta$, $0=J<=j_{max}$, then the gNB can abort the detection (i.e., no need to perform detection at starting point $(J+1) \times \Delta$, $J+2$, . . . , $j_{max}$).

For example, let $\Delta$ be the step size of the offset in slots, expressed in units of D. Let Periodicity of UL CG be expressed in units of D also. Here D is the duration of one PUSCH repetition, for example, D=1 slot if slot-level repetition of PUSCH is used, and D=1 mini-slot if mini-slot-level repetition of PUSCH is used. If a transmission is not allowed to cross the periodicity boundary, then $$j_{max} = \left\lfloor \frac{Periodicity - repK}{\Delta} \right\rfloor \quad (1)$$

If a transmission is allowed to cross the periodicity boundary, then $$j_{max} = \left\lfloor \frac{\text{Periodicity} - 1}{\Delta} \right\rfloor \qquad (2)$$

While ($j_{max}$+1) gives the maximum number of possible transmission sets that can fit into a period, it may be necessary to allow less than ($j_{max}$+1) transmission sets. This is because ($j_{max}$+1) maximum number of possible transmission sets requires gNB to perform up to ($j_{max}$+1) detections of PUSCH transmission for a given TB. In order to limit the detection burden of gNB, it may be desirable to allow transmission sets 0,1, . . . , $j'_{max}$, where $j'_{max} \leq j_{max}$. Value $j'_{max}$ can be determined by the acceptable detection burden at gNB. Typical values of $j'_{max}$ are: 2, 4, 8.

FIG. 8 shows an example of possible transmission of UL configured grant with repetition and starting occasion offset. The UL configured grant with repetition is configured with periodicity=10 slots, with repK=4. The offset step size 4=2 (slots). For simplicity, in this example, $j_{max}$=3 assuming that the PUSCH repetition cannot cross the periodicity boundary, $j'_{max}$=$j_{max}$=3, i.e., gNB need to perform up to (3+1)=4 detection of a given uplink TB. In FIG. 8(a)-(d), due to starting occasion offset, the 4 possible TB transmission sets start with the $0^{th}$, $2^{nd}$, $4^{th}$, $6^{th}$ slot, respectively, counting from the start of the period. As illustrated, each possible transmission set has the full amount of repK slots in duration, i.e., so that the full number of repetitions may be transmitted no matter the transmission set used. The UE may select to start transmission of the TB repetitions using any of the transmission sets in (a)-(d), whichever gives the lowest alignment latency of the arriving uplink data packet.

Figure 9:
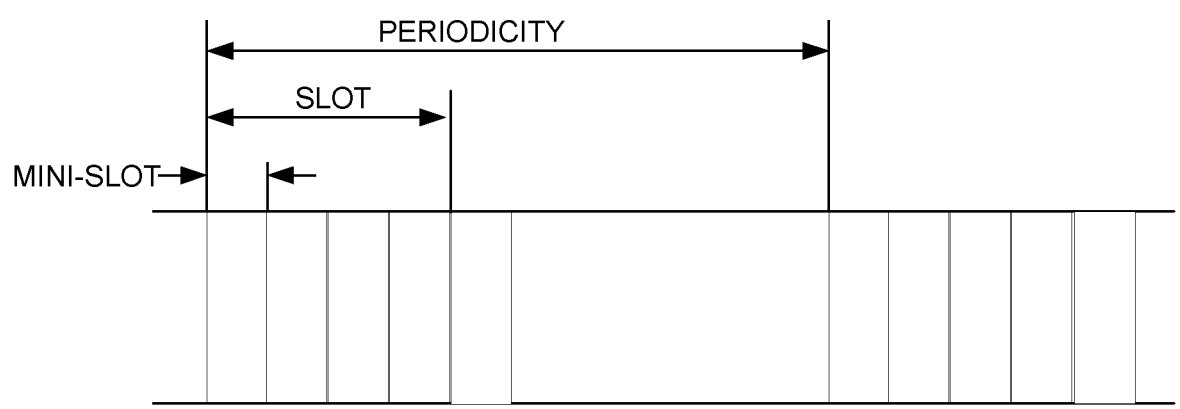
FIG. 9 is a block diagram of an uplink configured grant with repetition that is configured with a mini-slot duration, according to some embodiments.

In the description and illustrations above, the offset is in units of a slot, since each repetition of a TB transmission is in units of slot. The same principle can be applied, if the repetitions have other units. For example, if each repetition of a TB transmission is in units of mini-slot, then the offset can be defined in units of mini-slot as well. In this case, equation (1) and (2) and related description above can be simply reused by using the unit of mini-slot. This is illustrated with an example in FIGS. 9 and 10. In this example, the UL configured grant with repetition is configured with mini-slot duration ≅¼ slot, with periodicity=3 slots≅12 mini-slots, and with repK=5 (mini-slots). The offset step size Δ=2 (mini-slots). For simplicity, in this example, $j_{max}$=3 assuming that the PUSCH repetition cannot cross the periodicity boundary, $j'_{max}$=$j_{max}$=3, i.e., gNB needs to perform up to (3+1)=4 detections of a given uplink TB. Due to starting occasion offset, the 4 possible TB transmission sets start with the $0^{th}$, $2^{nd}$, $4^{th}$, $6^{th}$ mini-slot, respectively, counting from the start of the period. As illustrated, each possible transmission set has the full amount of repK mini-slots in duration. The UE may select to start transmission using any of (a)-(d), whichever gives the lowest alignment latency of the arriving uplink data packet.

In the above description, for simplicity, it was assumed that the mini-slots are of the same duration. However, the same principle can be applied, if not all the mini-slots are of the same duration. For example, in the illustration of FIG. 9 and FIG. 10, for a given transmission set of 5 mini-slots, the durations of the mini-slots are 4, 4, 3, 3, 3 symbols, respectively, in some of these embodiments. Here the symbol refers to OFDM symbol if OFDM is used for PUSCH transmission, and refers to a Discrete Fourier Transport (DFT) spread OFDM (DFT-s-OFDM) symbol if DFT-s-OFDM is used for PUSCH transmission.

In other embodiments, the unit of repetition and the unit of starting occasion offset can be different as well. For example, in one embodiment, repetition uses mini-slot as a unit of duration, while starting occasion offset uses slot as a unit. In another embodiments, repetition uses slot as a unit of duration, while starting occasion offset uses number of symbols as a unit.

In any event, since each possible transmission set has the full set of repK repetitions, the redundancy version (RV) of each transmission set can start with the first RV in the RV sequence. That is, for a given transmission set, for the nth transmission occasion among repK repetitions, n=1, 2, . . . , repK, it is associated with (mod(n−1,4)+1)$^{th}$ value in the configured RV sequence. For UL configured grant, the RV sequence can be configured as one of: {0,2,3,1}, {0,3,0,3}, {0,0,0,0}.

To configure the offset step size, a field in some embodiments is added to the ConfiguredGrantConfig as illustrated below. For example, "offset-step" field is added. The corresponding values are provided in units of symbols, for example, 'symb2' means two OFDM (or DFT-s-OFDM) symbols, 'sym2×14' means 2×14 symbols (which is equal to 2 slots, since a slot=14 symbols).

```
ConfiguredGrantConfig information element
ConfiguredGrantConfig ::=   SEQUENCE{
   ...
   repK              ENUMERATED {n1, n2, n4, n8},
   repK-RV           ENUMERATED {s1-0231, s2-0303, s3-0000}
   offset-step       ENUMERATED {0, sym2, sym7, sym1x14, sym2x14,
                         sym3x14, sym4x14} OPTIONAL,  -- Need R
   periodicity       ENUMERATED { sym2, sym7, sym1x14, sym2x14,
sym4x14, sym5x14, sym8x14, sym10x14, sym16x14, sym20x14, sym32x14,
sym40x14, sym64x14, sym80x14, sym128x14, sym160x14, sym256x14,
sym320x14, sym512x14, sym640x14, sym1024x14, sym1280x14, sym2560x14,
sym5120x14, sym6, sym1x12, sym2x12, sym4x12, sym5x12, sym8x12, sym10x12,
sym16x12, sym20x12, sym32x12, sym40x12, sym64x12, sym80x12, sym128x12,
sym160x12, sym256x12, sym320x12, sym512x12, sym640x12, sym1280x12,
sym2560x12},
   ...
}
```

Note that in the discussion above, it was assumed that multiple consecutive repetitions are always transmitted. In some embodiments, though, such as may be the case in a real system, the repetitions may be skipped or delayed if the repetition overlaps with certain unavailable slots or symbols.

For example, in a time division duplexing (TDD) system, a DL slot is a type of unavailable slot from the perspective of PUSCH transmission. If a repetition of PUSCH overlaps with a DL slot, then the repetition may be skipped (i.e., not transmitted). This has the effect of ensuring the PUSCH transmission ends after repK repetitions as measured from the start of a transmission set. Or, the repetition may be delayed. This has the effect of preserving repK actual PUSCH repetitions.

An unavailable slot or symbol for PUSCH transmission can be caused by other reasons as well. For example, due to PUCCH transmission, SRS transmission, etc.

Other parameter(s) may be configured as a function of Offset Step in some embodiments. To ensure the reliability of K repetitions, gNB may direct UEs to consider different configurations as a function of offset.

In some embodiments, a UE can be provided with less reliable configuration when it uses smaller offset step size, if the less reliable configuration provides other benefits. For example, the gNB may choose not to configure PUSCH frequency hopping when offset step size is small. Non-frequency-hopping of PUSCH makes it easier to multiplex several UEs' uplink transmission, although non-frequency-hopping tends to provide less reliable PUSCH transmission due to lack of frequency diversity. Moderately inferior PUSCH reliability can be tolerated since smaller offset gives denser transmission set opportunities, hence lower alignment delay. If the transmission set (K repetitions) fail, the UE may still have a time to follow up with the retransmission or reattempt.

On the other hand, if gNB configures a UE to transmit with a bigger offset step size, then the gNB may need to compensate by giving the UE more reliable configurations. For example, the gNB may choose to configure PUSCH with frequency hopping when the offset step size is large. This is because, UE may not have time left after the transmission set (K repetitions) to perform retransmission, since the larger offset step size leads to longer alignment delay.

While frequency hopping configuration is used as an example in the above discussion, other parameters can also be configured as a function of offset step size. For example, Demodulation Reference Signal (DMRS) configuration, Sounding Reference Signal (SRS) configuration, etc.

Semi-Statically Scheduled PDSCH Repetition with Time Offset in Starting Occasion While the above discussion focused on the PUSCH of UL CG, the same principle can be defined for semi-statically scheduled PDSCH (which is also called "DL SPS"). PDSCH repetition for transmission of a TB is supported in DL SPS, similar to UL configured grant. The parameter names of DL-SPS may or may not be the same as the parameters of UL configured grant even though the same functions are defined. For example, while 'repK' is used to define the number of PUSCH repetitions for UL configured grant, 'pdsch-AggregationFactor' is used to define the number of PDSCH repetitions for DL SPS.

Since each possible transmission set has the full set of 'pdsch-AggregationFactor' repetitions, the RV of each transmission set can start with the first RV in the RV sequence. That is, for a given transmission set, for the nth transmission occasion among repK repetitions, n=1, 2, . . . , repK, it is associated with $(\mathrm{mod}(n-1,4)+1)^{th}$ value in the RV sequence. For DL SPS, the RV sequence is typically predefined as $\{0,2,3,1\}$.

To configure the offset step size, a field can be added to the SPS-Config as illustrated below. For example, "offset-step" field is added. The corresponding values are provided in units of symbols.

SPS-Config Information Element

```
-- ASN1START
-- TAG-SPS-CONFIG-START
SPS-Config ::=                SEQUENCE {
   offset-step                   ENUMERATED {0, sym2, sym7, sym1x14,
                                 sym2x14, sym3x14, sym4x14} PTIONAL,    -- Need R
   periodicity                   ENUMERATED {ms10, ms20, ms32, ms40, ms64,
                                 ms80, ms128, ms160, ms320, ms640,
                                 spare6, spare5, spare4, spare3, spare2, spare1},
   nrofHARQ-Processes            INTEGER (1..8),
   n1PUCCH-AN                    PUCCH-ResourceId  OPTIONAL,    -- Need M
   mcs-Table                     ENUMERATED {qam64LowSE}  OPTIONAL,
                                                                 -- Need S
   ...
}
-- TAG-SPS-CONFIG-STOP
-- ASN1STOP
```

For DL SPS, there can also be unavailable slots or symbols from the perspective of DL SPS transmission. For example, in a time division duplexing (TDD) system, an UL slot is a type of unavailable slot from the perspective of DL SPS PDSCH transmission. If a repetition of PDSCH overlaps with a UL slot, then the repetition may be skipped (i.e., not transmitted). This has the effect of ensuring the PDSCH transmission ends after 'pdsch-AggregationFactor' repetitions as measured from the start of a transmission set. Or, the repetition may be delayed. This has the effect of preserving 'pdsch-AggregationFactor' actual PDSCH repetitions.

An unavailable slot or symbol for DL-SPS PDSCH transmission can be caused by other reasons, for example, due to broadcast PDSCH transmission (e.g., System Information Block (SIB), paging, Random Access Response (RAR)), Channel State Information Reference Signal (CSI-RS) transmission, CORESET of PDCCH, coexistence with LTE DL channels or signals, etc.

Similar to the description above for UL CG, a gNB may provide other parameter configurations as a function of offset step size for DL SPS. For example, the gNB gives a UE less reliable configuration when offset step size is small, while more reliable configuration when offset step size is large.

Note that, in some embodiments, a Medium Access Control (MAC) entity includes a HARQ entity for each Serving Cell with configured uplink (including the case when it is configured with supplementaryUplink), which maintains a number of parallel HARQ processes. Each HARQ process supports one TB. Each HARQ process is associated with a HARQ process identifier. For UL transmission with UL grant in Radnom Access (RA) Response, HARQ process identifier 0 is used. When the MAC entity is configured with pusch-AggregationFactor>1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

When the MAC entity is configured with pdsch-AggregationFactor>1, the parameter pdsch-AggregationFactor provides the number of transmissions of a TB within a bundle of the dynamic downlink assignment. Bundling operation relies on the HARQ entity for invoking the same HARQ process for each transmission that is part of the same bundle. After the initial transmission, pdsch-AggregationFactor−1 HARQ retransmissions follow within a bundle.

Figure 11:
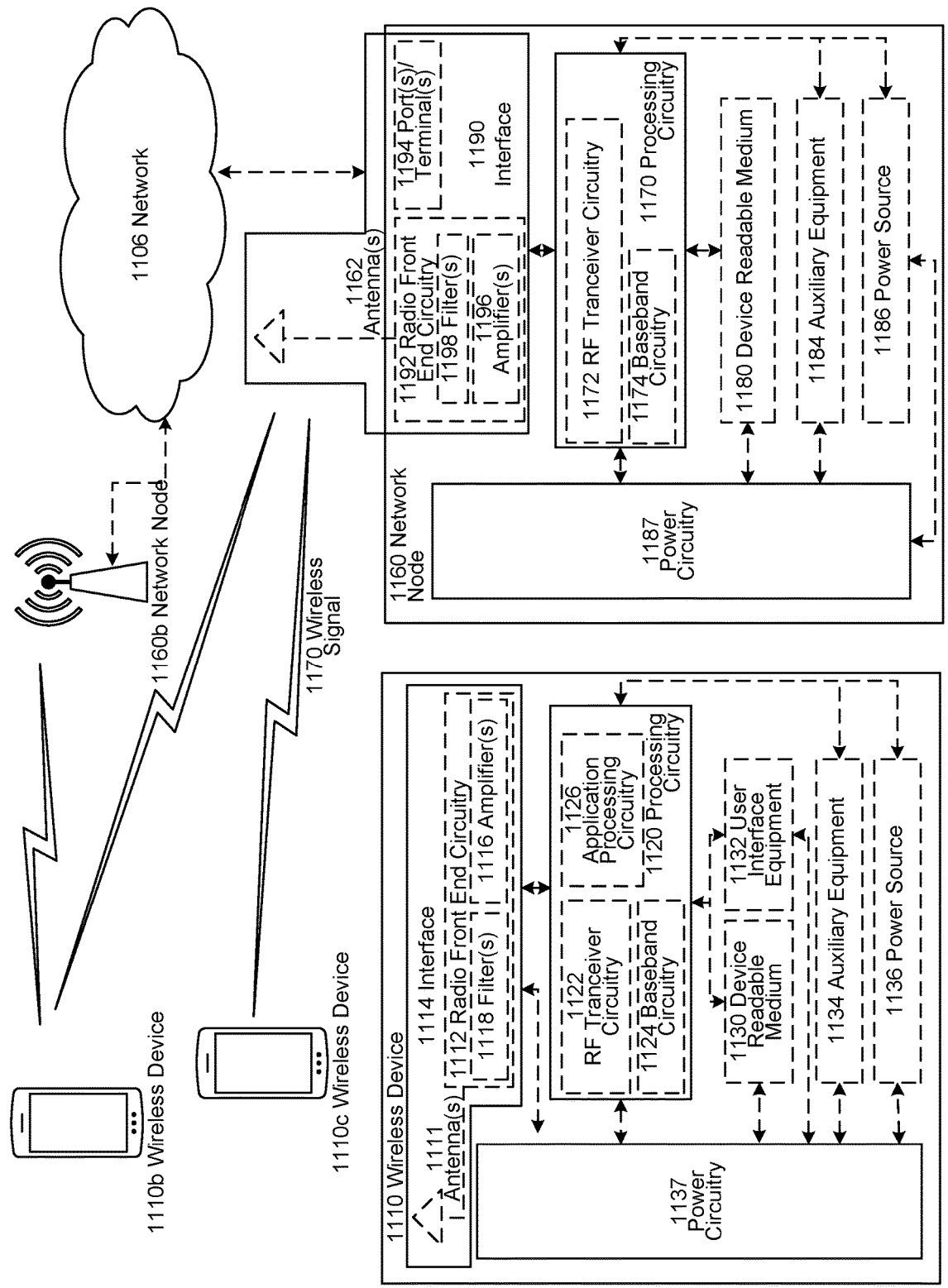
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170.

In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., ata voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
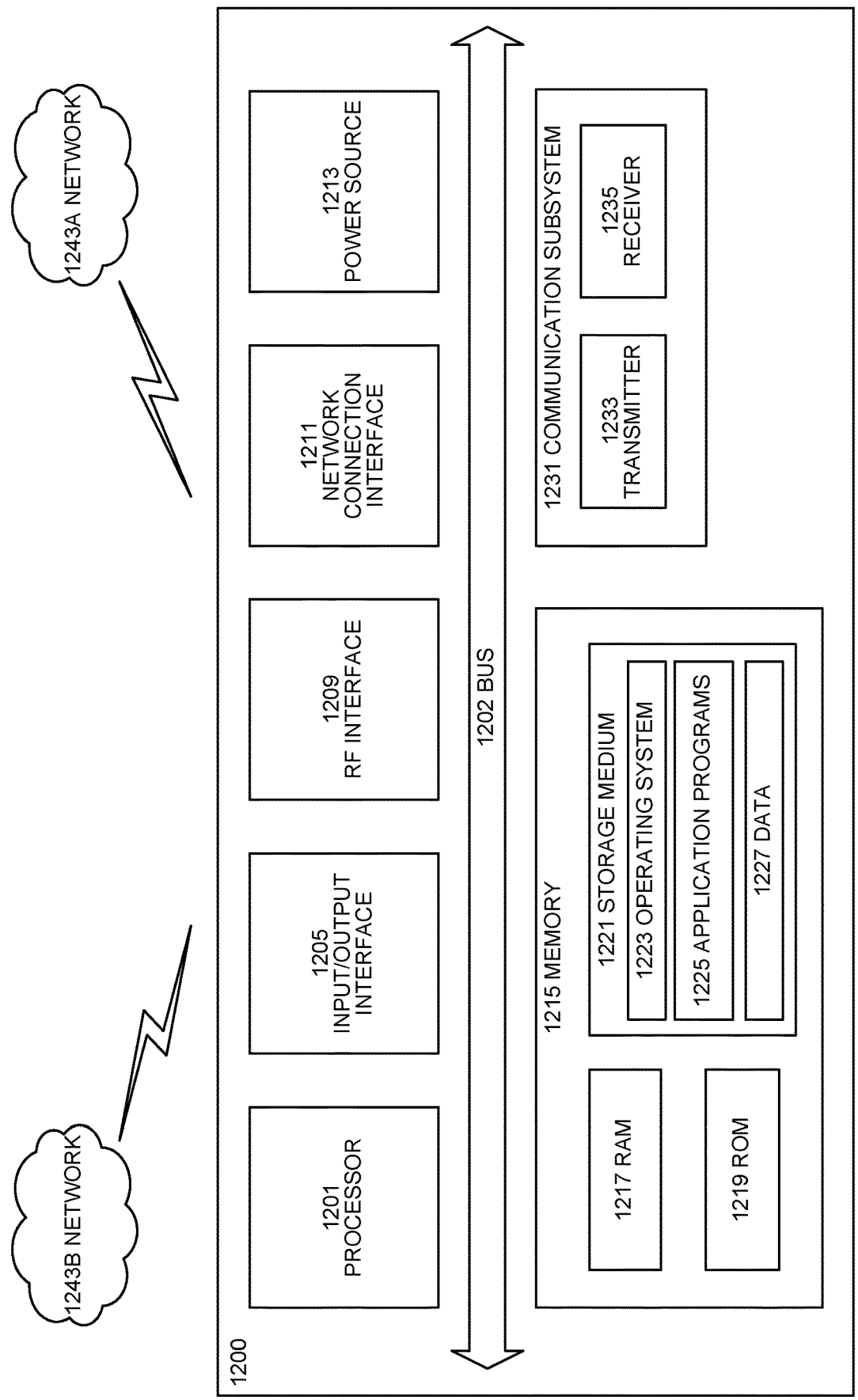
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
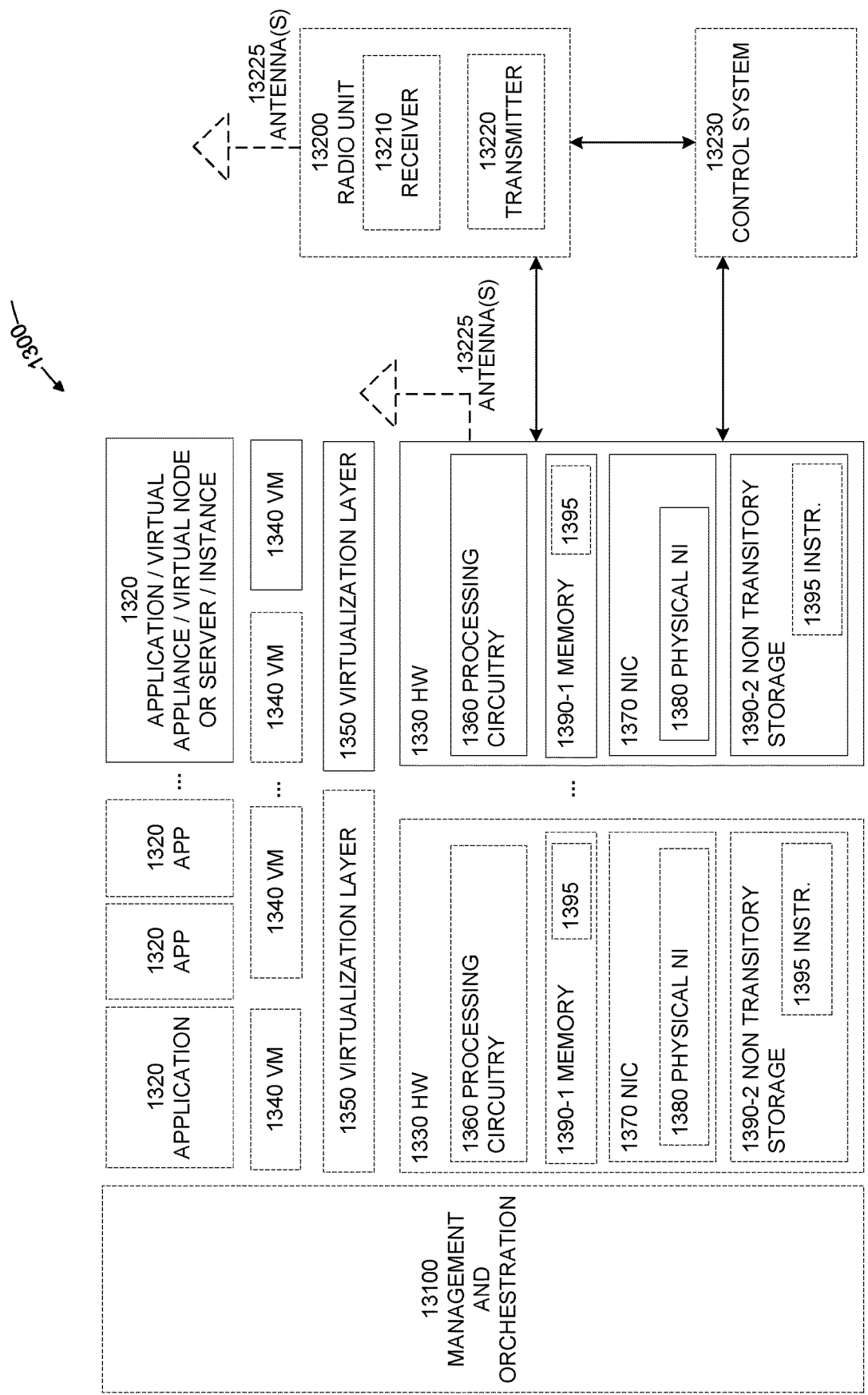
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
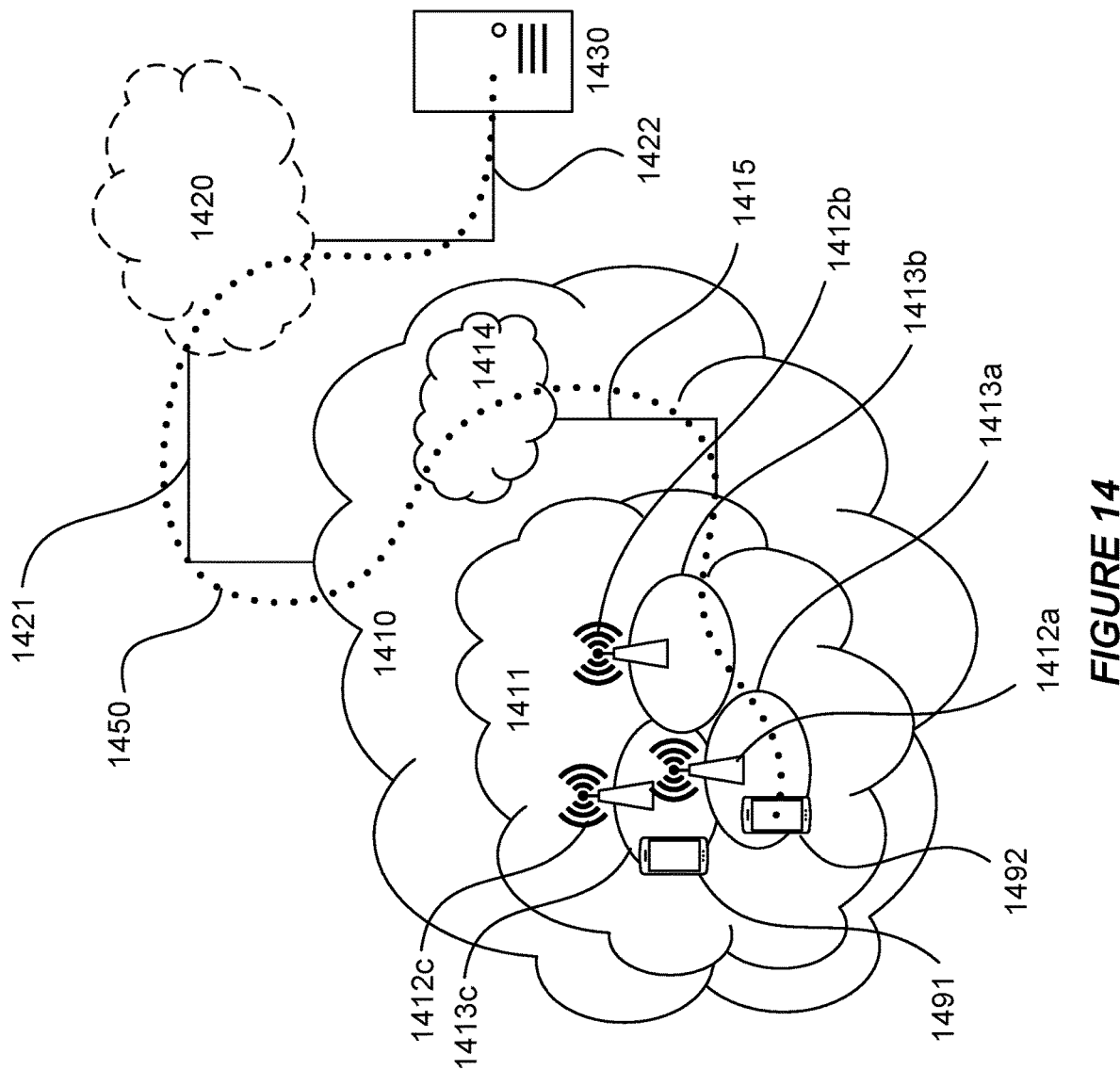
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
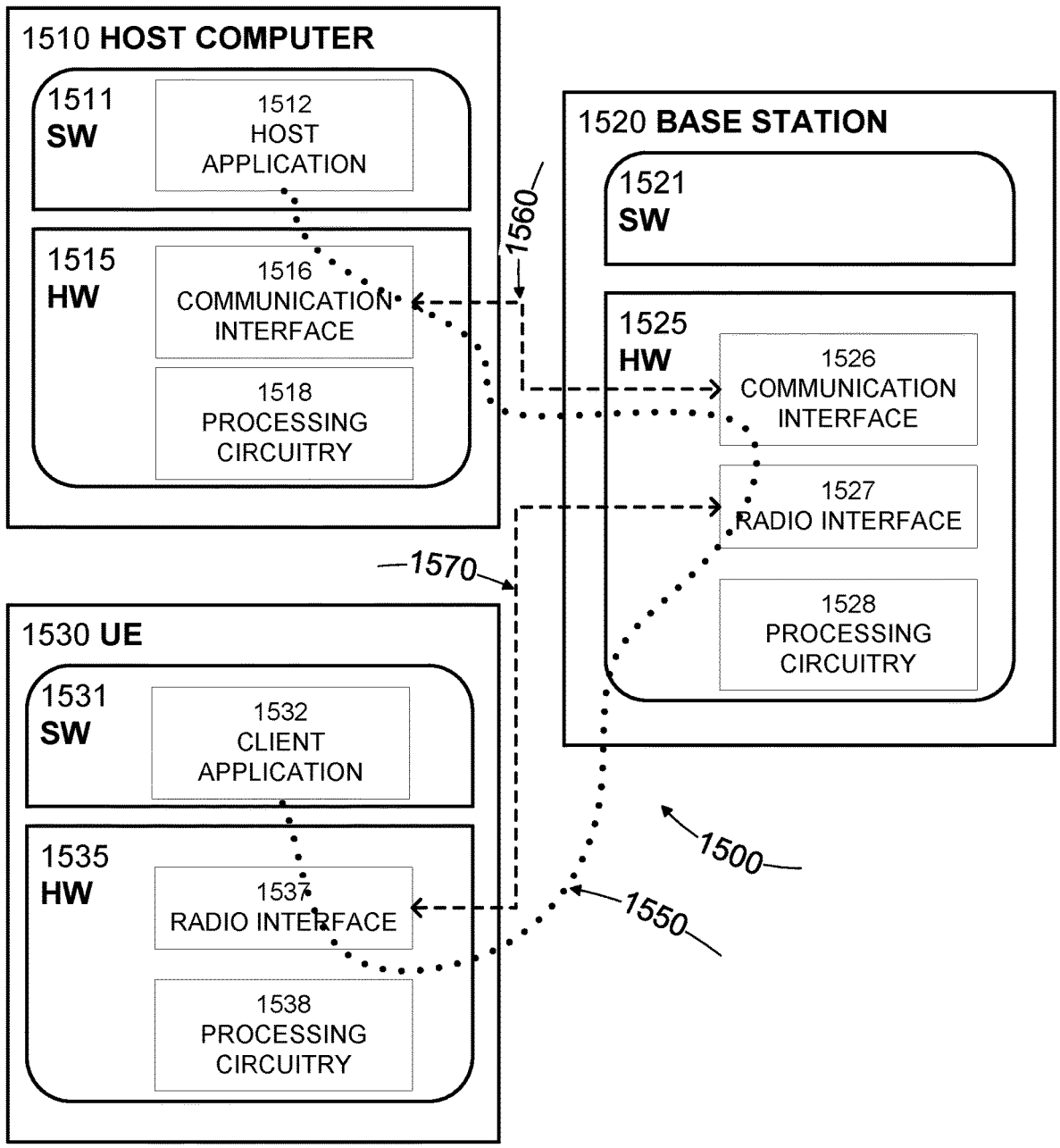
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency, reliability, and throughput of transmissions and thereby provide benefits such as reduced user waiting time, better responsiveness, and relaxed restriction on file size.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
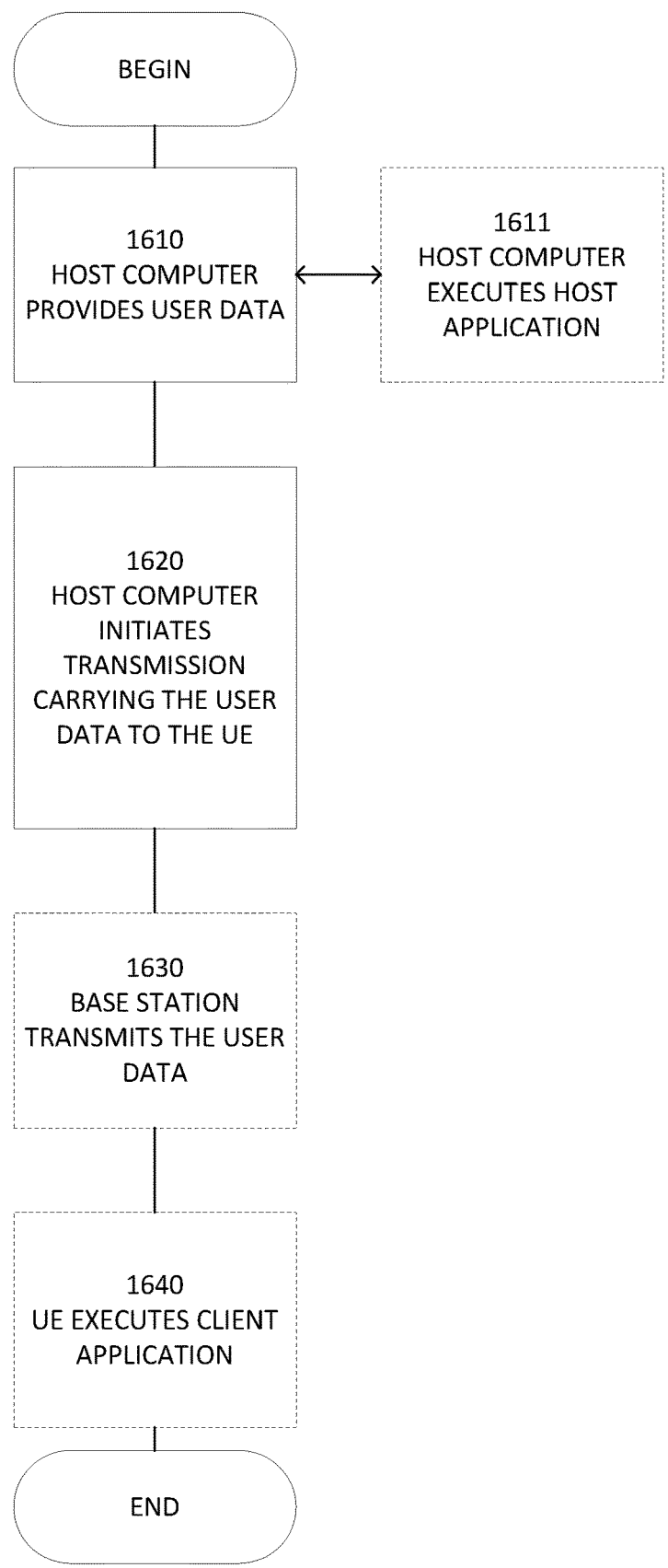
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
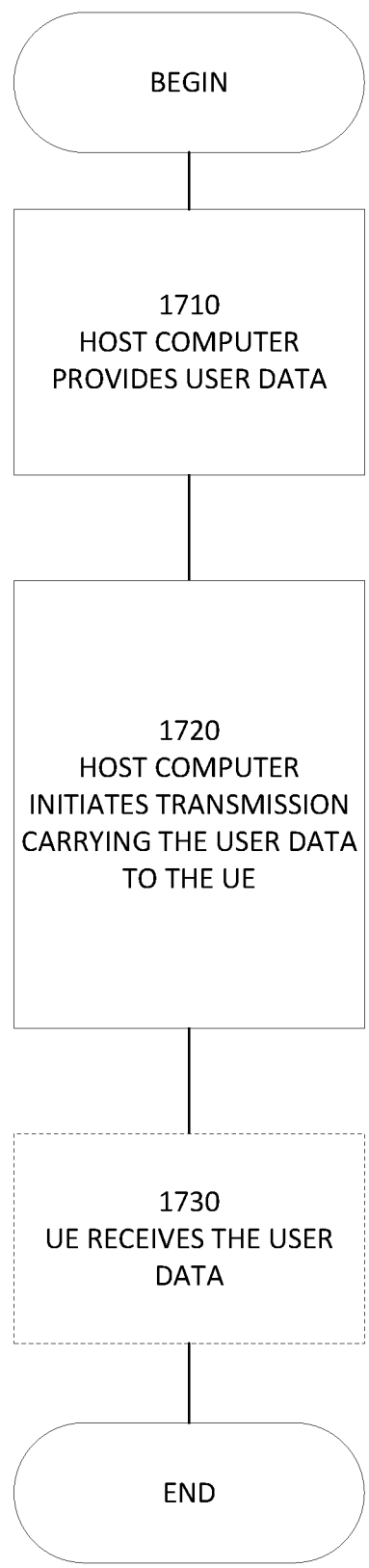
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
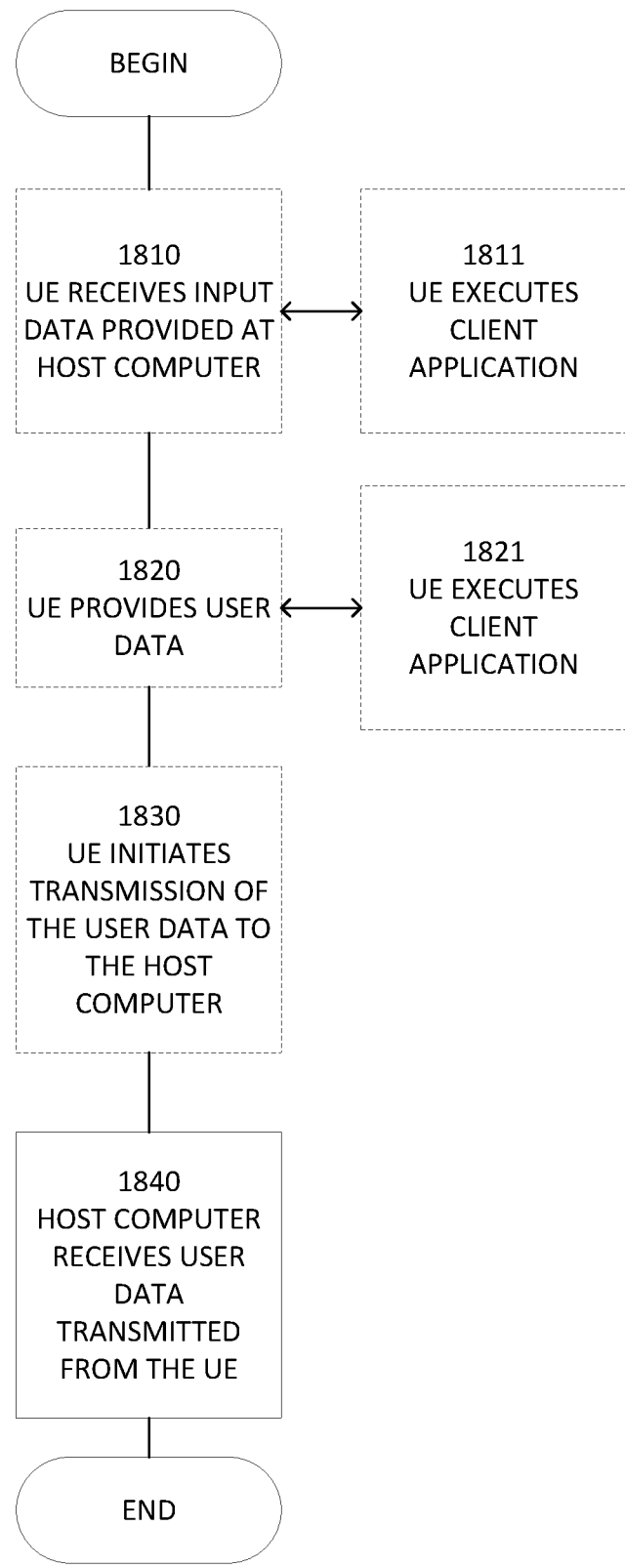
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
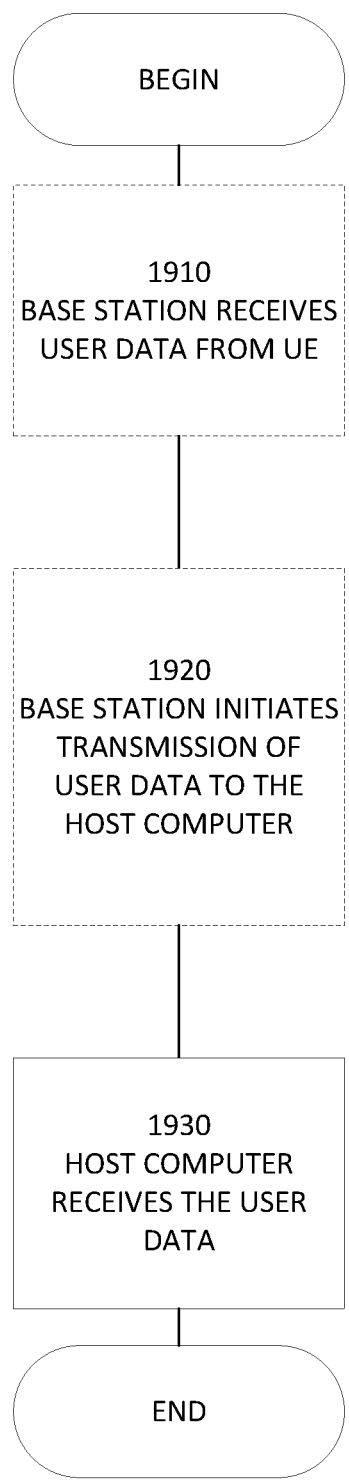
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device, the method comprising:
  receiving, from a radio network node, control signaling that configures an uplink grant or downlink assignment to periodically recur, configures a number of redundant transmissions of a transport block that are transmittable within a bundle of the configured uplink grant or downlink assignment, and configures different sets of transmission occasions within which the number of redundant transmissions are transmittable during, or starting during, a period of the configured uplink grant or downlink assignment.

A2. The method of embodiment A1, wherein the control signaling configures the different sets of transmission occasions by configuring an offset in time between the first transmission occasions of successively occurring ones of the different sets of transmission occasions.

A3. The method of any of embodiments A1-A2, wherein the control signaling configures the different sets of transmission occasions by configuring an offset in time between a start of the period and the first transmission occasion of the first set of transmission occasions to start after the start of the period.

A4. The method of any of embodiments A2-A3, wherein the control signaling includes an offset-step field that indicates the offset.

A5. The method of any of embodiments A2-A4, further comprising determining, as a function of the period and the offset, a number of the different sets of transmission occasions.

A6. The method of any of embodiments A2-A5, further comprising calculating a number $j_{max}$ of the different sets of transmission occasions as:

$$j_{max} = \left\lfloor \frac{\text{Periodicity} - K}{\Delta} \right\rfloor$$

or $$j_{max} = \left\lfloor \frac{\text{Periodicity} - 1}{\Delta} \right\rfloor$$

where Periodicity is the period, K is the number of the redundant transmissions, and $\Delta$ is the offset.

A7. The method of any of embodiments A1-A6, wherein the control signaling configures the different sets of transmission occasions by configuring a number of the different sets of transmission occasions.

A8. The method of embodiment A7, further comprising determining, as a function of the period and the number of the different sets of transmission occasions, an offset in time between the first transmission occasions of successively occurring ones of the different sets of transmission occasions.

A9. The method of any of embodiments A7-A8, further comprising calculating an $\Delta$ offset in time between the first transmission occasions of successively occurring ones of the different sets of transmission occasions as:

$$\Delta = \left\lfloor \frac{\text{Periodicity}}{(j_{max} + 1)} \right\rfloor$$

where Periodicity is the period and $j_{max}$ is the number of the different sets of transmission occasions.

A10. The method of any of embodiments A1-A9, further comprising calculating the period Periodicity as:

$$\text{Periodicity} = \Delta * (j_{max} + 1)$$

where $\Delta$ is an offset in time between the first transmission occasions of successively occurring ones of the different sets of transmission occasions, and where $j_{max}$ is the number of the different sets of transmission occasions.

A11. The method of any of embodiments A1-A10, wherein at least one of the sets of transmission occasions has a first transmission occasion that starts within the period and has a last transmission occasion that starts after an end of the period.

A12. The method of any of embodiments A1-A11, wherein the redundant transmissions of a transport block within a bundle are hybrid automatic repeat request, HARQ, retransmissions of the transport block, with each HARQ retransmission being transmitted without waiting for feedback from a previous transmission within the bundle.

A13. The method of embodiment A13, wherein the different HARQ retransmissions comprise respective redundancy versions of the transport block.

A14. The method of embodiment A14, wherein a first redundancy version in a redundancy version sequence for the transport block is transmittable in the first transmission occasion of each of the different sets of transmission occasions.

A15. The method of any of embodiments A1-A14, further comprising transmitting or receiving according to the configured uplink grant or downlink assignment as configured by the control signaling.

A16. The method of any of embodiments A1-A15, wherein the configured uplink grant or downlink assignment is a configured uplink grant.

A17. The method of embodiment A16, wherein the control signaling comprises a ConfiguredGrantConfig information element of a Radio Resource Control, RRC, message.

A18. The method of any of embodiments A16-A17, further comprising:
  obtaining a transport block to transmit to the radio network node; and
  selecting, from among the different sets of transmission occasions, a set of transmission occasions within which to transmit the number of redundant transmissions of the transport block.

A19. The method of embodiment A18, wherein said selecting comprises selecting the next set of transmission occasions that occurs after the transport block is obtained or after the number of redundant transmissions of the transport block are obtained.

A20. The method of any of embodiments A1-A15, wherein the configured uplink grant or downlink assignment is a configured downlink assignment.

A21. The method of embodiment A20, wherein the control signaling comprises a SPS-Config information element of a Radio Resource Control, RRC, message.

A22. The method of any embodiments A20-A21, further comprising attempting to detect the number of redundant transmissions of a transport block within each of one or more of the different sets of transmission occasions.

A23. The method of any of embodiments A1-A22, further comprising determining, based on a number of the different sets of transmission occasions or an offset in time between a start of the period and the first transmission occasion of the first set of transmission occasions to start after the start of the period, how or whether to configure one or more of:
  frequency hopping for the configured uplink grant or downlink assignment;
  demodulation reference signal, DMRS, for the configured uplink grant or downlink assignment; and
  sounding reference signal, SRS, for the configured uplink grant or downlink assignment.

A24. A method performed by a wireless device, the method comprising:
  receiving, from a radio network node, control signaling that configures an uplink grant or downlink assignment to periodically recur and configures a number of redundant transmissions of a transport block that are transmittable within a bundle of the configured uplink grant or downlink assignment;
  determining different sets of transmission occasions within which the number of redundant transmissions are transmittable during, or starting during, a period of the configured uplink grant or downlink assignment; and
  transmitting or receiving one or more redundant transmissions of a transport block within one of the determined sets of transmission occasions.

A25. The method of embodiment A24, wherein said determining is performed based on a predefined offset in time between the first transmission occasions of successively occurring ones of the different sets of transmission occasions.

A26. The method of any of embodiments A24-A25, wherein said determining is performed based on a predefined offset in time between a start of the period and the first transmission occasion of the first set of transmission occasions to start after the start of the period.

A27. The method of any of embodiments A25-A26, wherein said determining comprises determining, as a function of the period and the offset, a number of the different sets of transmission occasions.

A28. The method of any of embodiments A25-A27, wherein said determining comprising calculating a number $j_{max}$ of the different sets of transmission occasions as:

$$j_{max} = \left\lfloor \frac{\text{Periodicity} - K}{\Delta} \right\rfloor$$

or $$j_{max} = \left\lfloor \frac{\text{Periodicity} - 1}{\Delta} \right\rfloor$$

where Periodicity is the period, K is the number of the redundant transmissions, and $\Delta$ is the offset.

A29. The method of any of embodiments A24-A28, wherein said determining is performed based on a predefined number of the different sets of transmission occasions.

A30. The method of embodiment A29, wherein said determining comprising determining, as a function of the period and the number of the different sets of transmission occasions, an offset in time between the first transmission occasions of successively occurring ones of the different sets of transmission occasions.

A31. The method of any of embodiments A29-A30, wherein said determining comprises calculating an $\Delta$ offset in time between the first transmission occasions of successively occurring ones of the different sets of transmission occasions as:

$$\Delta = \left\lfloor \frac{\text{Periodicity}}{(j_{max} + 1)} \right\rfloor$$

where Periodicity is the period and $j_{max}$ is the number of the different sets of transmission occasions.

A32. The method of any of embodiments A24-A31, wherein said determining comprising calculating the period Periodicity as:

$$\text{Periodicity} = \Delta * (j_{max} + 1)$$

where $\Delta$ is an offset in time between the first transmission occasions of successively occurring ones of the different sets of transmission occasions, and where $j_{max}$ is the number of the different sets of transmission occasions.

A33. The method of any of embodiments A24-A32, wherein at least one of the sets of transmission occasions has a first transmission occasion that starts within the period and has a last transmission occasion that starts after an end of the period.

A34. The method of any of embodiments A34-A33, wherein the redundant transmissions of a transport block within a bundle are hybrid automatic repeat request, HARQ, retransmissions of the transport block, with each HARQ retransmission being transmitted without waiting for feedback from a previous transmission within the bundle.

A35. The method of embodiment A34, wherein the different HARQ retransmissions comprise respective redundancy versions of the transport block.

A36. The method of embodiment A35, wherein a first redundancy version in a redundancy version sequence for the transport block is transmittable in the first transmission occasion of each of the different sets of transmission occasions.

A37. The method of any of embodiments A24-A36, wherein the configured uplink grant or downlink assignment is a configured uplink grant.

A38. The method of embodiment A37, further comprising:
obtaining a transport block to transmit to the radio network node; and
selecting, from among the different sets of transmission occasions, a set of transmission occasions within which to transmit the number of redundant transmissions of the transport block.

A39. The method of embodiment A38, wherein said selecting comprises selecting the next set of transmission occasions that occurs after the transport block is obtained or after the number of redundant transmissions of the transport block are obtained.

A40. The method of any of embodiments A24-A36, wherein the configured uplink grant or downlink assignment is a configured downlink assignment.

A41. The method of embodiment A40, further comprising attempting to detect the number of redundant transmissions of a transport block within each of one or more of the different sets of transmission occasions.

A42. The method of any of embodiments A24-A41, further comprising determining, based on a number of the different sets of transmission occasions or an offset in time between a start of the period and the first transmission occasion of the first set of transmission occasions to start after the start of the period, how or whether to configure one or more of:
frequency hopping for the configured uplink grant or downlink assignment;
demodulation reference signal, DMRS, for the configured uplink grant or downlink assignment; and
sounding reference signal, SRS, for the configured uplink grant or downlink assignment.

AA. The method of any of the previous embodiments, further comprising:
providing user data; and
forwarding the user data to a host computer via the transmission to the base station.

Group B Embodiments

B1. A method performed by a radio network node, the method comprising:
transmitting, to a wireless device, control signaling that configures an uplink grant or downlink assignment to periodically recur, configures a number of redundant transmissions of a transport block that are transmittable within a bundle of the configured uplink grant or downlink assignment, and configures different sets of transmission occasions within which the number of redundant transmissions are transmittable during, or starting during, a period of the configured uplink grant or downlink assignment.

B2. The method of embodiment B1, wherein the control signaling configures the different sets of transmission occasions by configuring an offset in time between the first transmission occasions of successively occurring ones of the different sets of transmission occasions.

B3. The method of any of embodiments B1-B2, wherein the control signaling configures the different sets of transmission occasions by configuring an offset in time between a start of the period and the first transmission occasion of the first set of transmission occasions to start after the start of the period.

B4. The method of any of embodiments B2-B3, wherein the control signaling includes an offset-step field that indicates the offset.

B5. The method of any of embodiments B2-B4, further comprising determining, as a function of the period and the offset, a number of the different sets of transmission occasions.

B6. The method of any of embodiments B2-B5, further comprising calculating a number $j_{max}$ of the different sets of transmission occasions as:

$$j_{max} = \left\lfloor \frac{\text{Periodicity} - K}{\Delta} \right\rfloor$$

or $$j_{max} = \left\lfloor \frac{\text{Periodicity} - 1}{\Delta} \right\rfloor$$

where Periodicity is the period, K is the number of the redundant transmissions, and $\Delta$ is the offset.

B7. The method of any of embodiments B1-B6, wherein the control signaling configures the different sets of transmission occasions by configuring a number of the different sets of transmission occasions.

B8. The method of embodiment B7, further comprising determining, as a function of the period and the number of the different sets of transmission occasions, an offset in time between the first transmission occasions of successively occurring ones of the different sets of transmission occasions.

B9. The method of any of embodiments B7-B8, further comprising calculating an $\Delta$ offset in time between the first transmission occasions of successively occurring ones of the different sets of transmission occasions as:

$$\Delta = \left\lfloor \frac{\text{Periodicity}}{(j_{max} + 1)} \right\rfloor$$

where Periodicity is the period and $j_{max}$ is the number of the different sets of transmission occasions.

B10. The method of any of embodiments B1-B9, further comprising calculating the period Periodicity as:

Periodicity=$\Delta$*($j_{max}$+1)

where $\Delta$ is an offset in time between the first transmission occasions of successively occurring ones of the different sets of transmission occasions, and where $j_{max}$ is the number of the different sets of transmission occasions.

B11. The method of any of embodiments B1-B10, wherein at least one of the sets of transmission occasions has a first transmission occasion that starts within the period and has a last transmission occasion that starts after an end of the period.

B12. The method of any of embodiments B1-B11, wherein the redundant transmissions of a transport block within a bundle are hybrid automatic repeat request, HARQ, retransmissions of the transport block, with each HARQ retransmission being transmitted without waiting for feedback from a previous transmission within the bundle.

B13. The method of embodiment B13, wherein the different HARQ retransmissions comprise respective redundancy versions of the transport block.

B14. The method of embodiment B14, wherein a first redundancy version in a redundancy version sequence for the transport block is transmittable in the first transmission occasion of each of the different sets of transmission occasions.

B15. The method of any of embodiments B1-B14, further comprising transmitting or receiving according to the configured uplink grant or downlink assignment as configured by the control signaling.

B16. The method of any of embodiments B1-B15, wherein the configured uplink grant or downlink assignment is a configured uplink grant.

B17. The method of embodiment B16, wherein the control signaling comprises a ConfiguredGrantConfig information element of a Radio Resource Control, RRC, message.

B18. The method of any of embodiments B16-B17, further comprising attempting to detect the number of redundant transmissions of a transport block within each of one or more of the different sets of transmission occasions.

B19. The method of any of embodiments B1-B15, wherein the configured uplink grant or downlink assignment is a configured downlink assignment.

B20. The method of embodiment B19, wherein the control signaling comprises a SPS-Config information element of a Radio Resource Control, RRC, message.

B21. The method of any embodiments B19-B20, further comprising:
    obtaining a transport block to transmit to the wireless device; and
    selecting, from among the different sets of transmission occasions, a set of transmission occasions within which to transmit the number of redundant transmissions of the transport block.

B22. The method of embodiment B21, wherein said selecting comprises selecting the next set of transmission occasions that occurs after the transport block is obtained or after the number of redundant transmissions of the transport block are obtained.

B23. The method of any of embodiments B1-B22, further comprising determining, based on a number of the different sets of transmission occasions or an offset in time between a start of the period and the first transmission occasion of the first set of transmission occasions to start after the start of the period, how or whether to configure one or more of:
    frequency hopping for the configured uplink grant or downlink assignment;
    demodulation reference signal, DMRS, for the configured uplink grant or downlink assignment; and
    sounding reference signal, SRS, for the configured uplink grant or downlink assignment.

B24. A method performed by a radio network node, the method comprising:
    transmitting, to a wireless device, control signaling that configures an uplink grant or downlink assignment to periodically recur and configures a number of redundant transmissions of a transport block that are transmittable within a bundle of the configured uplink grant or downlink assignment;
    determining different sets of transmission occasions within which the number of redundant transmissions are transmittable during, or starting during, a period of the configured uplink grant or downlink assignment; and
    transmitting or receiving one or more redundant transmissions of a transport block within one of the determined sets of transmission occasions.

B25. The method of embodiment B24, wherein said determining is performed based on a predefined offset in time between the first transmission occasions of successively occurring ones of the different sets of transmission occasions.

B26. The method of any of embodiments B24-B25, wherein said determining is performed based on a predefined offset in time between a start of the period and the first transmission occasion of the first set of transmission occasions to start after the start of the period.

B27. The method of any of embodiments B25-B26, wherein said determining comprises determining, as a function of the period and the offset, a number of the different sets of transmission occasions.

B28. The method of any of embodiments B25-B27, wherein said determining comprising calculating a number $j_{max}$ of the different sets of transmission occasions as:

$$j_{max} = \left\lfloor \frac{\text{Periodicity} - K}{\Delta} \right\rfloor$$

or $$j_{max} = \left\lfloor \frac{\text{Periodicity} - 1}{\Delta} \right\rfloor$$

where Periodicity is the period, K is the number of the redundant transmissions, and $\Delta$ is the offset.

B29. The method of any of embodiments B24-B28, wherein said determining is performed based on a predefined number of the different sets of transmission occasions.

B30. The method of embodiment B29, wherein said determining comprising determining, as a function of the period and the number of the different sets of transmission occasions, an offset in time between the first transmission occasions of successively occurring ones of the different sets of transmission occasions.

B31. The method of any of embodiments B29-B30, wherein said determining comprises calculating an $\Delta$ offset in time between the first transmission occasions of successively occurring ones of the different sets of transmission occasions as:

$$\Delta = \left\lfloor \frac{\text{Periodicity}}{(j_{max} + 1)} \right\rfloor$$

where Periodicity is the period and $j_{max}$ is the number of the different sets of transmission occasions.

B32. The method of any of embodiments B24-B31, wherein said determining comprising calculating the period Periodicity as:

Periodicity=$\Delta*j_{max}+1$)

where $\Delta$ is an offset in time between the first transmission occasions of successively occurring ones of the different sets of transmission occasions, and where $j_{max}$ is the number of the different sets of transmission occasions.

B33. The method of any of embodiments B24-B32, wherein at least one of the sets of transmission occasions has a first transmission occasion that starts within the period and has a last transmission occasion that starts after an end of the period.

B34. The method of any of embodiments B34-B33, wherein the redundant transmissions of a transport block within a bundle are hybrid automatic repeat request, HARQ, retransmissions of the transport block, with each HARQ retransmission being transmitted without waiting for feedback from a previous transmission within the bundle.

B35. The method of embodiment B34, wherein the different HARQ retransmissions comprise respective redundancy versions of the transport block.

B36. The method of embodiment B35, wherein a first redundancy version in a redundancy version sequence for the transport block is transmittable in the first transmission occasion of each of the different sets of transmission occasions.

B37. The method of any of embodiments B24-B36, wherein the configured uplink grant or downlink assignment is a configured uplink grant.

B38. The method of embodiment B37, further comprising attempting to detect the number of redundant transmissions of a transport block within each of one or more of the different sets of transmission occasions.

B39. The method of any of embodiments B24-B36, wherein the configured uplink grant or downlink assignment is a configured downlink assignment.

B40. The method of embodiment B39, further comprising:
 obtaining a transport block to transmit to the wireless device; and
 selecting, from among the different sets of transmission occasions, a set of transmission occasions within which to transmit the number of redundant transmissions of the transport block.

B41. The method of embodiment B40, wherein said selecting comprises selecting the next set of transmission occasions that occurs after the transport block is obtained or after the number of redundant transmissions of the transport block are obtained.

B42. The method of any of embodiments B24-B41, further comprising determining, based on a number of the different sets of transmission occasions or an offset in time between a start of the period and the first transmission occasion of the first set of transmission occasions to start after the start of the period, how or whether to configure one or more of:
 frequency hopping for the configured uplink grant or downlink assignment;
 demodulation reference signal, DMRS, for the configured uplink grant or downlink assignment; and
 sounding reference signal, SRS, for the configured uplink grant or downlink assignment.

BB. The method of any of the previous embodiments, further comprising:
 obtaining user data; and
 forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
 communication circuitry; and
 processing circuitry configured to perform any of the steps of any of the Group A embodiments.

C4. A wireless device comprising:
 processing circuitry configured to perform any of the steps of any of the Group A embodiments; and
 power supply circuitry configured to supply power to the wireless device.

C5. A wireless device comprising:
 processing circuitry and memory, the memory containing instructions executable by the processing circuitry whereby the wireless device is configured to perform any of the steps of any of the Group A embodiments.

C6. A user equipment (UE) comprising:
 an antenna configured to send and receive wireless signals;
 radio front-end circuitry connected to the antenna and to processing circuitry, and configured to condition signals communicated between the antenna and the processing circuitry;
 the processing circuitry being configured to perform any of the steps of any of the Group A embodiments;
 an input interface connected to the processing circuitry and configured to allow input of information into the UE to be processed by the processing circuitry;
 an output interface connected to the processing circuitry and configured to output information from the UE that has been processed by the processing circuitry; and
 a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:
 communication circuitry; and
 processing circuitry configured to perform any of the steps of any of the Group B embodiments.

C12. A radio network node comprising:
 processing circuitry configured to perform any of the steps of any of the Group B embodiments;
 power supply circuitry configured to supply power to the radio network node.

C13. A radio network node comprising:
 processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
 processing circuitry configured to provide user data; and
 a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station,
wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.
D25. The communication system of the previous 2 embodiments, further including the UE, wherein the UE is configured to communicate with the base station.
D26. The communication system of the previous 3 embodiments, wherein:
the processing circuitry of the host computer is configured to execute a host application;
the UE is configured to execute a client application associated with the host application, thereby providing the user data to be received by the host computer.
D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
D28. The method of the previous embodiment, further comprising at the base station, receiving the user data from the UE.
D29. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
5G 5th Generation
ACK Acknowledgement
CE Control Element
CG Configured Grant
DCI Downlink Control Information
GF Grant-Free
gNB Next Generation NodeB
ID Identity
LCH Logical Channel
MCS Modulation and Coding Scheme
NACK No Acknowledgement
PUSCH Physical Uplink Shared Channel
SPS Semi-Persistent Scheduling
SUL Supplemental Uplink
TO Transmission Occasion
URLLC Ultra-Reliable and Low-Latency Communication
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device, the method comprising:
receiving, from a radio network node, control signaling that configures one of an uplink grant and a downlink assignment to periodically recur, configures a number of redundant transmissions of a transport block that are transmittable within a bundle of the configured uplink grant or downlink assignment, the number being greater than or equal to one, and configures different sets of transmission occasions within which the number of redundant transmissions are one of transmittable during and starting during a period of the one of the uplink grant and the downlink assignment, the control signaling configuring the different sets of transmission occasions by configuring an offset, the control signaling including an offset-step field that indicates the offset, the offset being a number of slots up to a maximum number given by:

$$\Delta \text{ is the } j_{max} = \left\lfloor \frac{\text{Periodicity} - repK}{\Delta} \right\rfloor$$

where $\Delta$ is step size of the offset, Periodicity is the periodicity of configured uplink grants, repK is a duration of a set of transmission occasions, and where the periodicity and step size are in terms of a number of slots:
the configuring being a function of the offset and the configured uplink grant or downlink assignment being a configured downlink assignment; and
attempting to detect the number of redundant transmissions of a transport block within each of one or more of the different sets of transmission occasions.

2. The method of claim 1, further comprising determining, as a function of the period and the offset, a number of the different sets of transmission occasions.

3. The method of claim 1, wherein the control signaling configures the different sets of transmission occasions by configuring a number of the different sets of transmission occasions.

4. The method of claim 1, wherein the redundant transmissions of a transport block within a bundle are hybrid automatic repeat request (HARQ) retransmissions of the transport block, with each HARQ retransmission being transmitted without waiting for feedback from a previous transmission within the bundle.

5. The method of claim 4, wherein the different HARQ retransmissions comprise respective redundancy versions of the transport block, wherein a first redundancy version in a redundancy version sequence for the transport block is transmittable in the first transmission occasion of each of the different sets of transmission occasions.

6. The method of claim 1, further comprising one of transmitting and receiving according to the configured one of the uplink grant and the downlink assignment as configured by the control signaling.

7. The method of claim 1, wherein the configured one of the uplink grant and the downlink assignment is a configured uplink grant, wherein the control signaling comprises a ConfiguredGrantConfig information element of a Radio Resource Control (RRC) message.

8. The method of claim 1, further comprising:
obtaining a transport block to transmit to the radio network node; and
selecting, from among the different sets of transmission occasions, a set of transmission occasions within which to transmit the number of redundant transmissions of the transport block, wherein the selecting comprises selecting the next set of transmission occasions that occurs one of after the transport block is obtained and after the number of redundant transmissions of the transport block are obtained.

9. The method of claim 1, wherein the configured one of the uplink grant and the downlink assignment is a configured downlink assignment, and wherein the control signaling comprises a SPS-Config information element of a Radio Resource Control (RRC) message.

10. A method performed by a radio network node, the method comprising:
transmitting, to a wireless device, control signaling that configures one of an uplink grant and a downlink assignment to periodically recur, configures a number of redundant transmissions of a transport block that are transmittable within a bundle of the one of the configured uplink grant and the downlink assignment, the number being greater than or equal to one, and configures different sets of transmission occasions within which the number of redundant transmissions are transmittable one of during and starting during a period of the configured uplink grant or downlink assignment, the control signaling configuring the different sets of transmission occasions by configuring an offset, the offset being a number of slots up to a maximum number given by:

$$\Delta \text{ is the } j_{max} = \left\lfloor \frac{\text{Periodicity} - repK}{\Delta} \right\rfloor$$

where $\Delta$ is step size of the offset, Periodicity is the periodicity of configured uplink grants, repK is a duration of a set of transmission occasions, and where the periodicity and step size are in terms of a number of slots, D the configuring being a function of the offset;
the configured uplink grant or downlink assignment is a configured downlink assignment;
obtaining a transport block to transmit to the wireless device; and
selecting, from among the different sets of transmission occasions, a set of transmission occasions within which to transmit the number of redundant transmissions of the transport block, wherein said selecting comprises selecting the next set of transmission occasions that occurs after the transport block is obtained or after the number of redundant transmissions of the transport block are obtained.

11. The method of claim 10, further comprising determining, as a function of the period and the offset, a number of the different sets of transmission occasions.

12. The method of claim 10, wherein the control signaling configures the different sets of transmission occasions by configuring a number of the different sets of transmission occasions.

13. The method of claim 10, wherein the redundant transmissions of a transport block within a bundle are hybrid automatic repeat request (HARQ) retransmissions of the transport block, with each HARQ retransmission being transmitted without waiting for feedback from a previous transmission within the bundle.

14. The method of claim 13, wherein the different HARQ retransmissions comprise respective redundancy versions of the transport block, wherein a first redundancy version in a redundancy version sequence for the transport block is transmittable in the first transmission occasion of each of the different sets of transmission occasions.

15. The method of claim 10, further comprising one of transmitting and receiving according to the configured one of the uplink grant and the downlink assignment as configured by the control signaling.

16. The method of claim 10, wherein the configured one of the uplink grant and the downlink assignment is a configured downlink assignment, and wherein the control signaling comprises a SPS-Config information element of a Radio Resource Control (RRC) message.

17. A wireless device comprising:
communication circuitry; and
processing circuitry configured to:
receive, from a radio network node, control signaling that configures one of an uplink grant and a downlink assignment to periodically recur, configures a number of redundant transmissions of a transport block that are transmittable within a bundle of the configured one of the uplink grant and the downlink assignment, the number being greater than or equal to one, and configures different sets of transmission occasions within which the number of redundant transmissions are transmittable one of during and starting during a period of the configured one of the uplink grant and the downlink assignment, the control signaling configuring the different sets of transmission occasions by configuring an offset, the offset being a number of slots up to a maximum number given by:

$$\Delta \text{ is the } j_{max} = \left\lfloor \frac{\text{Periodicity} - repK}{\Delta} \right\rfloor$$

where $\Delta$ is step size of the offset, Periodicity is the periodicity of configured uplink grants, repK is a duration of a set of transmission occasions, and where the periodicity and step size are in terms of a number of slots, D;
the configuring being a function of the offset;
the configured one of the uplink grant and the downlink assignment is a configured downlink assignment; and
attempt to detect the number of redundant transmissions of a transport block within each of one or more of the different sets of transmission occasions.

18. A radio network node comprising:
communication circuitry; and
processing circuitry configured to:
transmit, to a wireless device, control signaling that configures one of an uplink grant and a downlink assignment to periodically recur, configures a number of redundant transmissions of a transport block that are transmittable within a bundle of the configured one of the uplink grant and the downlink assignment, the number being greater than or equal to one, and configures different sets of transmission occasions within which the number of redundant transmissions are transmittable one of during and starting during a period of the configured one of the uplink grant and the downlink assignment, the control signaling configuring the different sets of transmission occasions by configuring an offset, the offset being a number of slots up to a maximum number given by:

$$\Delta \text{ is the } j_{max} = \left\lfloor \frac{\text{Periodicity} - repK}{\Delta} \right\rfloor$$

where $\Delta$ is step size of the offset, Periodicity is the periodicity of configured uplink grants, repK is a duration of a set of transmission occasions, and where the periodicity and step size are in terms of a number of slots, D;
the configuring being a function of the offset;
the configured one of the uplink grant and downlink assignment being a configured downlink assignment;
obtain a transport block to transmit to the wireless device; and
select, from among the different sets of transmission occasions, a set of transmission occasions within which to transmit the number of redundant transmissions of the transport block, wherein said selecting comprises selecting the next set of transmission occasions that occurs after the transport block is obtained or after the number of redundant transmissions of the transport block are obtained.

* * * * *